United States Patent
Colrain et al.

(10) Patent No.: US 11,936,739 B2
(45) Date of Patent: Mar. 19, 2024

(54) AUTOMATED RESET OF SESSION STATE

(71) Applicant: Oracle International Corporation, Redwood Shores, CA (US)

(72) Inventors: Carol L. Colrain, Redwood Shores, CA (US); Kevin S. Neel, San Mateo, CA (US); Arturo Ismael Quinto, Guadalajara (MX)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/018,181

(22) Filed: Sep. 11, 2020

(65) Prior Publication Data

US 2022/0086234 A1  Mar. 17, 2022

Related U.S. Application Data

(60) Provisional application No. 62/899,653, filed on Sep. 12, 2019.

(51) Int. Cl.
*H04L 67/141*  (2022.01)
*G06F 16/22*  (2019.01)
(Continued)

(52) U.S. Cl.
CPC ........ *H04L 67/141* (2013.01); *G06F 16/2282* (2019.01); *G06F 16/252* (2019.01); *H04L 67/142* (2013.01); *H04L 67/143* (2013.01)

(58) Field of Classification Search
CPC ....... H04L 67/14; H04L 67/22; H04L 67/141; H04L 67/142; H04L 67/143;
(Continued)

(56) References Cited

U.S. PATENT DOCUMENTS 5,013,222 A  5/1991  Sokol et al.
5,680,610 A  10/1997  Smith et al.
(Continued)

FOREIGN PATENT DOCUMENTS

EP  0942363 A2  9/1999
EP  0992909 A2  4/2000
(Continued)

OTHER PUBLICATIONS

B. A. Fisch et al., "Malicious-Client Security in Blind Seer: A Scalable Private DBMS," 2015 IEEE Symposium on Security and Privacy, 2015, pp. 395-410, doi: 10.1109/SP.2015.31. (Year: 2015).*

(Continued)

*Primary Examiner* — James N Fiorillo
(74) *Attorney, Agent, or Firm* — Hickman Becker Bingham Ledesma LLP

(57) ABSTRACT

Techniques are described to perform an automatic reset of a database session to generate an environment that resembles a brand new session without the computational cost of creating a brand new session. In an embodiment, a DBMS receives a request from a client application to execute commands within a session. The DBMS identifies that the end request boundary, the end of the logical work unit for the client application, is reached within the session. The DBMS verifies that the end request boundary is at a resettable point of a session state of the session for the session to be safely reset. If the verification is successful, the DBMS performs a reset of the session to prevent any leakage of application-related session state to the next request.

16 Claims, 8 Drawing Sheets

(51) Int. Cl.
*G06F 16/25* (2019.01)
*H04L 67/142* (2022.01)
*H04L 67/143* (2022.01)

(58) Field of Classification Search
CPC .............. H04L 67/306; H04L 67/1002; H04L 65/1069; H04L 29/08; H04L 12/4641; G06F 16/22; G06F 16/25; G06F 16/252; G06F 16/273; G06F 16/2282; G06F 16/24554
USPC ...................................................... 709/227
See application file for complete search history.

(56) References Cited

U.S. PATENT DOCUMENTS

| | | |
|---|---|---|
| 5,758,345 A | 5/1998 | Wang |
| 5,774,668 A | 6/1998 | Choquier et al. |
| 5,835,724 A * | 11/1998 | Smith .................. H04L 67/306 715/251 |
| 5,890,167 A | 3/1999 | Bridge et al. |
| 5,918,059 A | 6/1999 | Tavallaei et al. |
| 5,951,694 A | 9/1999 | Choquier et al. |
| 6,041,357 A | 3/2000 | Kunzelman et al. |
| 6,088,728 A | 7/2000 | Bellemore et al. |
| 6,105,067 A | 8/2000 | Batra |
| 6,178,529 B1 | 1/2001 | Short et al. |
| 6,182,139 B1 | 1/2001 | Brendel |
| 6,243,751 B1 | 6/2001 | Chatterjee et al. |
| 6,272,503 B1 | 8/2001 | Bridge et al. |
| 6,327,622 B1 | 12/2001 | Jindal et al. |
| 6,347,313 B1 | 2/2002 | Ma et al. |
| 6,442,552 B1 | 8/2002 | Frolund et al. |
| 6,460,043 B1 * | 10/2002 | Tabbara .............. G06F 16/2423 |
| 6,556,659 B1 | 4/2003 | Bowman-Amuah |
| 6,587,866 B1 | 7/2003 | Modi et al. |
| 6,601,101 B1 | 7/2003 | Lee et al. |
| 6,667,751 B1 | 12/2003 | Wynn et al. |
| 6,728,747 B1 | 4/2004 | Jenkins et al. |
| 6,728,748 B1 | 4/2004 | Mangipudi et al. |
| 6,816,907 B1 | 11/2004 | Mei et al. |
| 6,868,445 B1 | 3/2005 | Chebrolu |
| 6,925,477 B1 | 8/2005 | Champagne et al. |
| 7,024,394 B1 | 4/2006 | Ashour et al. |
| 7,058,957 B1 | 6/2006 | Nguyen |
| 7,107,294 B2 | 9/2006 | Romanufa et al. |
| 7,174,379 B2 | 2/2007 | Agarwal et al. |
| 7,178,050 B2 | 2/2007 | Fung et al. |
| 7,263,590 B1 | 8/2007 | Todd et al. |
| 7,269,157 B2 | 9/2007 | Klinker et al. |
| 7,277,945 B1 | 10/2007 | Shah et al. |
| 7,290,056 B1 * | 10/2007 | McLaughlin, Jr. ......................... H04L 43/0852 709/201 |
| 7,346,690 B1 * | 3/2008 | Sinha ...................... G06F 16/20 709/227 |
| 7,366,755 B1 * | 4/2008 | Cuomo .................. H04L 12/66 709/227 |
| 7,415,470 B2 | 8/2008 | Kasamsetty et al. |
| 7,502,824 B2 | 3/2009 | Kaluskar et al. |
| 7,536,462 B2 | 5/2009 | Pandya |
| 7,539,746 B2 | 5/2009 | Bankier et al. |
| 7,552,218 B2 | 6/2009 | Kaluskar et al. |
| 7,631,107 B2 | 12/2009 | Pandya |
| 7,634,512 B2 | 12/2009 | Cao et al. |
| 7,747,754 B2 | 6/2010 | Kalaukar et al. |
| 7,761,435 B2 | 7/2010 | Stanev |
| 7,849,173 B1 | 12/2010 | Uhlik |
| 7,849,177 B2 | 12/2010 | Uhlik |
| 7,853,698 B2 | 12/2010 | Stanev et al. |
| 7,890,457 B2 | 2/2011 | Dias et al. |
| 7,890,458 B2 | 2/2011 | Dias et al. |
| 8,005,966 B2 | 8/2011 | Pandya |
| 8,024,299 B2 | 9/2011 | Dias et al. |
| 8,612,614 B2 * | 12/2013 | Jagannath ........... H04L 12/1859 709/227 |
| 2001/0056493 A1 | 12/2001 | Mineo |
| 2002/0073019 A1 | 6/2002 | Deaton |
| 2002/0073139 A1 | 6/2002 | Hawkins et al. |
| 2002/0116457 A1 | 8/2002 | Eshleman et al. |
| 2002/0129157 A1 | 9/2002 | Varsano |
| 2002/0143846 A1 * | 10/2002 | Montero ............... G06F 16/986 718/102 |
| 2002/0161896 A1 | 10/2002 | Wen et al. |
| 2002/0194015 A1 | 12/2002 | Gordon et al. |
| 2003/0005028 A1 | 1/2003 | Dritschler et al. |
| 2003/0007497 A1 | 1/2003 | March et al. |
| 2003/0028654 A1 | 2/2003 | Abjanic et al. |
| 2003/0063122 A1 | 4/2003 | Cichowlas et al. |
| 2003/0088671 A1 | 5/2003 | Klinker et al. |
| 2003/0108052 A1 | 6/2003 | Inoue et al. |
| 2003/0131045 A1 | 7/2003 | McGee et al. |
| 2003/0135642 A1 | 7/2003 | Beneddetto et al. |
| 2003/0204769 A1 | 10/2003 | Coughlin |
| 2003/0208523 A1 | 11/2003 | Gopalan |
| 2003/0217159 A1 | 11/2003 | Schramm-Apple et al. |
| 2004/0003041 A1 | 1/2004 | Moore et al. |
| 2004/0015600 A1 | 1/2004 | Tiwary et al. |
| 2004/0078602 A1 | 4/2004 | Rothbarth et al. |
| 2004/0111506 A1 | 6/2004 | Kundu et al. |
| 2004/0117794 A1 | 6/2004 | Kundu |
| 2004/0176996 A1 | 9/2004 | Powers et al. |
| 2004/0210500 A1 * | 10/2004 | Sobel ..................... G06Q 40/00 705/35 |
| 2004/0268357 A1 | 12/2004 | Joy |
| 2005/0021514 A1 | 1/2005 | Barga et al. |
| 2005/0021771 A1 | 1/2005 | Kaehn et al. |
| 2005/0038848 A1 | 2/2005 | Kaluskar et al. |
| 2005/0050116 A1 | 3/2005 | Gross et al. |
| 2005/0102261 A1 | 5/2005 | Todd |
| 2005/0131879 A1 | 6/2005 | Ghosh et al. |
| 2005/0132222 A1 | 6/2005 | Petrovic |
| 2005/0165925 A1 | 7/2005 | Dan et al. |
| 2005/0186975 A1 | 8/2005 | Yach et al. |
| 2005/0239476 A1 | 10/2005 | Betrabet et al. |
| 2005/0267965 A1 | 12/2005 | Heller |
| 2006/0036617 A1 | 2/2006 | Bastawala et al. |
| 2006/0129684 A1 * | 6/2006 | Datta ..................... H04L 69/40 709/229 |
| 2006/0282422 A1 | 12/2006 | Al-Omari |
| 2007/0067266 A1 | 3/2007 | Lomet |
| 2007/0226218 A1 | 9/2007 | Chatterjee et al. |
| 2007/0226323 A1 | 9/2007 | Halpern |
| 2007/0260714 A1 * | 11/2007 | Kalmuk ................. G06F 16/273 709/223 |
| 2008/0010240 A1 | 1/2008 | Zait |
| 2008/0046462 A1 * | 2/2008 | Kaufman ............. G06F 16/2423 707/999.102 |
| 2008/0097960 A1 | 4/2008 | Dias et al. |
| 2008/0097961 A1 | 4/2008 | Dias et al. |
| 2008/0097995 A1 | 4/2008 | Dias et al. |
| 2008/0097996 A1 | 4/2008 | Dias et al. |
| 2008/0098003 A1 | 4/2008 | Dias et al. |
| 2008/0098048 A1 | 4/2008 | Cao et al. |
| 2008/0134219 A1 | 6/2008 | Dorrance et al. |
| 2008/0228834 A1 | 9/2008 | Burchall et al. |
| 2008/0281846 A1 * | 11/2008 | Hoang ................. G06F 16/2379 |
| 2009/0077135 A1 | 3/2009 | Yalamanchi et al. |
| 2009/0100082 A1 * | 4/2009 | Kogan .................. G06F 9/5016 707/999.102 |
| 2009/0100180 A1 | 4/2009 | Chidambaran et al. |
| 2009/0132536 A1 * | 5/2009 | Brown .................. G06F 16/252 707/999.009 |
| 2009/0144546 A1 * | 6/2009 | Jancula ............... H04L 63/0428 713/168 |
| 2010/0005097 A1 * | 1/2010 | Liang ..................... G06F 16/27 707/E17.032 |
| 2010/0030818 A1 | 2/2010 | Cooper et al. |
| 2010/0036957 A1 | 2/2010 | Patel et al. |
| 2010/0042601 A1 | 2/2010 | Kelley et al. |
| 2010/0071043 A1 * | 3/2010 | Babula ................ H04L 63/0272 726/7 |

(56) References Cited

U.S. PATENT DOCUMENTS

| | | | |
|---|---|---|---|
| 2010/0293137 A1 | 11/2010 | Zuckerman et al. | |
| 2010/0318394 A1 | 12/2010 | Nayak et al. | |
| 2011/0191303 A1* | 8/2011 | Kaufman | G06F 16/951 707/684 |
| 2011/0212783 A1 | 9/2011 | Dale et al. | |
| 2011/0218981 A1 | 9/2011 | Retnakumari et al. | |
| 2011/0246419 A1 | 10/2011 | Yancey | |
| 2011/0276550 A1 | 11/2011 | Colle et al. | |
| 2012/0179645 A1 | 7/2012 | Lomet et al. | |
| 2013/0066837 A1* | 3/2013 | Colrain | G06F 16/2365 707/674 |
| 2013/0066948 A1* | 3/2013 | Colrain | H04L 67/146 709/203 |
| 2013/0066949 A1 | 3/2013 | Colrain et al. | |
| 2013/0066952 A1* | 3/2013 | Colrain | G06F 11/1438 709/203 |
| 2013/0066955 A1* | 3/2013 | Neel | H04L 67/63 709/203 |
| 2013/0167211 A1* | 6/2013 | Kamat | H04L 63/08 726/7 |
| 2013/0297566 A1 | 11/2013 | Colrain | |
| 2014/0095547 A1 | 4/2014 | Guo et al. | |
| 2014/0201838 A1* | 7/2014 | Varsanyi | G06F 21/552 726/23 |
| 2014/0229531 A1 | 8/2014 | Neel et al. | |
| 2015/0180894 A1* | 6/2015 | Sadovsky | H04W 12/12 726/22 |
| 2015/0326673 A1 | 11/2015 | Neel et al. | |
| 2016/0041882 A1 | 2/2016 | Kruse | |
| 2016/0094665 A1* | 3/2016 | Kellmereit | H04L 67/125 709/203 |
| 2016/0140178 A1* | 5/2016 | Sirohi | G06F 16/24542 707/718 |
| 2016/0328488 A1* | 11/2016 | Lytle | G06F 16/252 |
| 2017/0116235 A1* | 4/2017 | Yam | G06F 16/258 |
| 2017/0212965 A1* | 7/2017 | Gnech | G06F 16/957 |
| 2017/0220621 A1* | 8/2017 | Colrain | G06F 16/2365 |
| 2017/0289271 A1 | 10/2017 | Seed | |
| 2017/0310763 A1* | 10/2017 | Morgan | H04L 67/1027 |
| 2017/0322972 A1* | 11/2017 | Lee | G06F 16/137 |
| 2017/0359353 A1* | 12/2017 | Tan | G06F 16/122 |
| 2018/0129688 A1* | 5/2018 | Colrain | G06F 16/217 |
| 2019/0102401 A1* | 4/2019 | Neel | G06F 11/2023 |
| 2019/0163545 A1* | 5/2019 | Singh | G06F 16/22 |
| 2019/0180757 A1* | 6/2019 | Kothari | G06F 16/903 |
| 2020/0110832 A1* | 4/2020 | Kadyrov | G06F 3/0482 |
| 2020/0244625 A1* | 7/2020 | Tummalapenta | H04L 12/4633 |
| 2020/0401684 A1* | 12/2020 | Vath | G06F 21/41 |
| 2021/0064573 A1* | 3/2021 | Rao | G06F 16/128 |
| 2021/0081382 A1* | 3/2021 | Colrain | G06F 16/217 |

FOREIGN PATENT DOCUMENTS

| | | | | |
|---|---|---|---|---|
| EP | 1170662 A2 | 1/2002 | | |
| WO | WO02/05116 A2 | 1/2002 | | |
| WO | WO02/07037 A | 1/2002 | | |
| WO | WO02/097676 A2 | 12/2002 | | |
| WO | WO03/014928 A2 | 2/2003 | | |
| WO | WO 03/014929 A1 | 2/2003 | | |
| WO | WO03/062983 A2 | 7/2003 | | |
| WO | WO-2004040399 A2 * | 5/2004 | | G06F 16/2282 |
| WO | WO2008/051855 | 5/2008 | | |

OTHER PUBLICATIONS

U.S. Appl. No. 13/448,258, filed Apr. 16, 2012, Notice of Allowance, dated Oct. 30, 2014.
Colrain, U.S. Appl. No. 15/803,644, filed Nov. 3, 2017, Office Action, dated Mar. 9, 2020.
Kaluskar, U.S. Appl. No. 10/917,882, filed Aug. 12, 2004, Final Office Action, dated Oct. 16, 2008.
Kaluskar, U.S. Appl. No. 10/917,882, filed Aug. 12, 2004, Final Office Action, dated Sep. 10, 2009.
Kaluskar, U.S. Appl. No. 10/917,882, filed Aug. 12, 2004, Notice of Allowance, dated Feb. 8, 2010.
Kaluskar, U.S. Appl. No. 10/917,882, filed Aug. 12, 2004, Office Action, dated Apr. 15, 2008.
Kaluskar, U.S. Appl. No. 10/917,882, filed Aug. 12, 2004, Advisory Action, dated Nov. 12, 2009.
Kaluskar, U.S. Appl. No. 10/917,882, filed Aug. 12, 2004, Office Action, dated Feb. 20, 2009.
Neel, U.S. Appl. No. 16/147,314, filed Sep. 28, 2018, Office Action, dated Jul. 28, 2020.
Papadomanolakis, U.S. Appl. No. 13/076,313, filed Mar. 30, 2011, Notice of Allowance, dated Oct. 19, 2012.
Papadomanolakis, U.S. Appl. No. 13/076,313, filed Mar. 30, 2011, Office Action, dated Jun. 5, 2012.
U.S. Appl. No. 13/229,641, filed Sep. 9, 2011, Notice of Allowance, dated May 6, 2013.
U.S. Appl. No. 13/229,641, filed Sep. 9, 2011, Office Action, dated Nov. 26, 2012.
Colrain, U.S. Appl. No. 13/542,278, filed Jul. 5, 2012, Office Action, dated Nov. 23, 2012.
U.S. Appl. No. 13/448,258, filed Apr. 16, 2012, Office Action, dated May 27, 2014.
U.S. Appl. No. 10/917,882, filed Aug. 12, 2004, Office Action, dated Aug. 14, 2009.
U.S. Appl. No. 13/448,267, filed Apr. 16, 2013, Office Action, dated Jul. 23, 2013.
U.S. Appl. No. 13/448,267, filed Apr. 16, 2012, Office Action, dated Jan. 24, 2014.
U.S. Appl. No. 13/448,267, filed Apr. 16, 2012, Notice of Allowance, dated Aug. 14, 2014.
U.S. Appl. No. 13/542,278, filed Jul. 5, 2012, Notice of Allowance, dated Jun. 15, 2016.
U.S. Appl. No. 13/542,278, filed Jul. 5, 2012, Notice of Allowance, dated Nov. 4, 2016.
U.S. Appl. No. 13/542,278, filed Jul. 5, 2012, Office Action, dated Nov. 23, 2012.
U.S. Appl. No. 13/563,680, filed Jul. 31, 2012, Notice of Allowance, dated Dec. 23, 2013.
U.S. Appl. No. 14/231,347, filed Mar. 31, 2014, Notice of Allowance, dated Mar. 17, 2015.
U.S. Appl. No. 14/231,347, filed Mar. 31, 2014, Office Action, dated Nov. 19, 2014.
U.S. Appl. No. 14/748,451, filed Jun. 24, 2015, Notice of Allowance, dated Nov. 1, 2016.
U.S. Appl. No. 14/748,451, filed Jun. 24, 2015, Office Action, dated May 16, 2016.
U.S. Appl. No. 13/542,278, filed Jul. 5, 2012, Final Office Action, dated May 2, 2013.
U.S. Appl. No. 13/542,278, filed Jul. 5, 2012, Examiner's Answer, dated Jan. 29, 2014.
U.S. Appl. No. 13/448,258, filed Apr. 16, 2001, Office Action, dated Nov. 27, 2013.
Ying-Dar Lin et al., "Direct Web Switch Routing with State Migration, TCP Masquerade, and Cookie Name Rewriting," IEEE Global Telecommunications Conference, Dec. 1, 2003, pp. 3663-3667.
Liu et al., "ad-heap: an Efficient Heap Data Structure for Asymmetric Multicore Processors", in Proceedings of Workshop on General Purpose Processing Using GPUs, ACM, dated 2014, 10 pages.
LaMarca et al., "The Influence of Caches on the Performance of Heaps", dated Jan. 6, 1997, 26 pages.
Kokku, Ravi et al., "Half-Pipe Anchoring: An Efficient Technique for Multiple Connection Handoff," Proceedings of the 10th International Conference of Network Protocols, Nov. 12, 2002, 10 pages.
Jeffrey S. Chase et al., "Dynamic Virtual Clusters in a Grid Site Manager", Jun. 22, 2003, 11 pages.
Henry Song, et al., "Browser State Repository Service," Lecture Notes in Computer Science, vol. 2414, 2002, pp. 1-14.
Galanis et al., "Oracle Database Replay", ACM dated 2008, pp. 1159-1170.

(56) References Cited

OTHER PUBLICATIONS

Furtak et al., "Using SIMD Registers and Instructions to Enable Instruction-Level Parallelism in Sorting Algorithms", ACM Symposium on Parallel Algorithms and Architectures, dated 2007, 10 pages.
Eric Skow, et al., "A Security Architecture for Application Session Handoff," 2002 IEEE International Conference Proceedings, Apr. 28-May 2, 2002, vol. 1of 5, pp. 2058-2063.
D.E. Knuth, "The Art of Computer Programming", vol. 3: 2nd Edition Sorting and Searching, ISBN: 0-201-03803-X, pp. 129-157 from book, dated 1973.
Colle et al., "Oracle Database Replay", ACM, dated 2009, 4 pages.
"Webopedia Definition and Links" 1996 definition of "server" available at: http://web.archive.org/web/20010411032957/http://www.webopedia.com/TERM/s/server.html (3 pages).
"TechWeb Network" 2003 definition of "client": available at: http://www.techweb.com/encyclopedia/printView?term=client&view=print (5 pages).
"Database Replay", Oracle White Paper, dated 2007, 19 pages.
"28 Transparent Application Failover", Oracle® Database JDBC Developer's Guide and Reference 10g Release 2 (10.2) Part No. B14355-04 from the Internet on Jul. 25, 2011, dated 1999 (3 pages).
Neel, U.S. Appl. No. 16/147,314, filed Sep. 28, 2018, Pre-Brief Appeal Conference decision, Dec. 23, 2022.
Neel, U.S. Appl. No. 16/147,314, filed Sep. 28, 2018, Examiner's Answer to Appeal Brief, Mar. 3, 2023.

\* cited by examiner

AUTOMATED RESET OF SESSION STATE

BENEFIT CLAIM AND RELATED APPLICATIONS

This application claims the benefit under 35 U.S.C. § 119(e) of provisional application 62/899,653, filed on Sep. 12, 2019, the entire content of which is hereby incorporated by reference for all purposes as if fully set forth herein.

This application is related to U.S. application Ser. No. 16/147,314 "Session State Tracking," filed on Sep. 28, 2018, the entire contents of which is hereby entirely incorporated by reference as if fully set forth herein; and U.S. application Ser. No. 15/803,644, entitled "Safe Release of Database Sessions for Planned Maintenance Operations," filed on Nov. 3, 2017, the entire contents of which is hereby entirely incorporated by reference as if fully set forth herein.

This application is also related to (1) U.S. Pat. No. 9,600,371, entitled "Preserving Server-Client Session Context," filed Jul. 5, 2012, the entire contents of which is hereby entirely incorporated by reference as if fully set forth herein; (2) U.S. Pat. No. 8,924,346, entitled "Idempotence For Database Transactions," filed Apr. 16, 2012, the entire contents of which is hereby entirely incorporated by reference as if fully set forth herein; (3) U.S. Pat. No. 8,984,170, entitled "Idempotence For Database Transactions," filed Apr. 16, 2012, the entire contents of which is hereby entirely incorporated by reference as if fully set forth herein; (4) U.S. Pat. No. 8,549,154, entitled "Recovering Stateful Read-Only Database Sessions," filed Sep. 9, 2011, the entire contents of which is hereby entirely incorporated by reference as if fully set forth herein; (5) U.S. Pat. No. 8,725,882, entitled "Masking Database Outages From Clients And Applications," filed Jul. 31, 2012, the entire contents of which is hereby entirely incorporated by reference as if fully set forth herein; (6) U.S. Pat. No. 9,124,670, entitled "Transactional And Non-Transactional Data For Maintaining Session State," filed Mar. 31, 2014, the entire contents of which is hereby entirely incorporated by reference as if fully set forth herein; (7) U.S. Pat. No. 9,591,103, entitled "Transactional And Non-Transactional Data For Maintaining Session State," filed Jun. 24, 2015, the entire contents of which is hereby entirely incorporated by reference as if fully set forth herein; (8) U.S. Pat. No. 7,747,754, entitled "Transparent Migration Of Stateless Sessions Across Servers," filed Aug. 12, 2004, the entire contents of which is hereby entirely incorporated by reference as if fully set forth herein; (9) U.S. Pat. No. 7,502,824, entitled "Database Shutdown With Session Migration," filed May 1, 2006, the entire contents of which is hereby entirely incorporated by reference as if fully set forth herein; (10) U.S. Pat. No. 7,552,218, entitled "Transparent Session Migration Across Servers," filed Aug. 12, 2004, the entire contents of which is hereby entirely incorporated by reference as if fully set forth herein; (11); and (13) U.S. Pat. No. 8,380,665, entitled "Application Workload Capture And Replay System," filed Mar. 30, 2011, the entire contents of which is hereby entirely incorporated by reference as if fully set forth herein.

FIELD OF THE TECHNOLOGY

The present invention relates to the field of electronic database management, in particular to an automated reset of session state.

BACKGROUND

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A stateless application does not use a session state that originated from the prior usage of the session by another request of the application. A request includes one or more database commands, which may be executed independently of any prior request. Thus, the application has a stateless session state between requests. However, for executing commands within a request, a particular session state may be set by the application or server. A session state may be maintained for a database application by instantiating one or more session objects on the application/client-side and/or database management system/server-side. Such objects may include cursors, temporary tables, temporary lobs, roles, database links, and a global variable set (e.g., PLSQL). For a stateless application, if the previous usage of the session sets the session state, none of the previously instantiated session objects must carryover (leak) to the next request.

Scale, security, and cloud computing are driving the stateless application design. In a cloud environment, applications should be stateless for the sake of scalability and portability. Statelessness enables greater scalability since the server does not have to maintain, update, or communicate the previous session state.

Additionally, when choosing a server for servicing a request (e.g., for load balancing), there is no need to ensure the session state is preserved from any of the previous request(s) by taking into account which server serviced those prior request(s). Thus, without worrying about the session state dependence in stateless systems, a selection decision based on the characteristics of the servers may be made, improving the system's efficiency.

To take advantage of the benefits for a stateless request, a stateless application requires that the necessary state to handle the request be contained within the request itself. Web-based requests, being inherently stateless, may accomplish this by embedding the state information as part of the URL, query-string parameters, body, or headers.

For a Representational State Transfer-based protocols (REST)-based application or any other stateless application, for example, the client must include all information for the server to fulfill the request, resending session state as necessary if that state must span multiple requests. Although the request includes the whole session state, the request may still contain complex session states such as temporary tables.

Unless well written, applications may have an inherent issue with leakage of session states. Such applications may have no mechanism to self-enforce the resetting of the session state. Instead, such enforcement is left to an exercise of the developer following best practices not to allow the next request to see the prior usage. With no actions taken, application sessions states such as user identifiers, temporary tables, cursors, and temporary LOBs and session sequences may leak to other session usages. Such leakage makes it possible to continue to fetch from a cursor bound to one bank account in later requests using that same session. Naturally, this may lead to unwanted and unexpected results, and even worse, high impact security issues when an application leaks application-related states.

The problem of leaks extends to transactions. In a database management system (DBMS), some pool managers allow connections to be returned to the pool with open transactions. The connection pool may provide the connection to a later request that inadvertently can modify that prior open transaction. The problem is exacerbated for shared connection pools where many data sources share the one connection pool. One approach is to raise an error if an application returns a connection with an open transaction to the pool. Another approach is to rollback transactions left open on return to the pool. Another approach is to commit; SQLPLUS, for example, commits on the logout from the session.

The problem of leaking session state across requests is grave for a multi-tenant container DBMS where states may leak across databases. The session container may switch amongst the pluggable database services within the multi-tenant container DBMS. After switching to a different pluggable database service, the service attributes and features such as service metrics, FAN, load balancing, resource manager, transaction guard, application continuity are reset to that new service. Session and transaction states from the prior service must not carry over. When switching session containers, a reset of the session container is requested to clear the session states. This is a heavy operation that clears the services and internal and external session state usage when switching containers for the new service.

Applications may address this problem by requesting a new session for each request (dedicated session and dedicated server process, or dedicated session but shared server processes across a particular application). However, this approach has a significant performance cost because generating a new session for every request is expensive both for the client-driver and for the DBMS servicing the session. This approach is offered by (dedicated resident connection pooling (DRCP)).

To avoid the performance cost, most client applications use a lighter weight model to ensure that 10's of thousands of requests can be serviced by a DBMS from different applications. In a pooled arrangement, any application request may reuse both the session and the server process. Therefore, the state session created by the application in one request may leak to another request in pooled environments.

The approach to solving applications leaking session state is left to the application developers. The application has to be programmed to reset/configure session state for its request by a) forcing reset of session state by using ALTER SESSION and other such tools to reset attribute values), b) having the application reset the session state by making client-side and server-side calls, or c) override the configuration to request a new session for the request. Otherwise, for example, if a previous request has set the language attribute of the session to French and the next request of another application reuses the same session and sets the attribute to German, the language for the next request may still have the French value. The server-side process that is shared may have overridden the client-side configuration of the session state.

Even if an application is configured to reset some of the session's state by special procedure(s) provided by the DBMS and its driver, such procedure call(s) have to be comprehensive to completely reset the state of the session and prevent the session leakage. For example, a DMBS may provide a special procedure that re-initializes the global state variables, which are part of a session state. However, even if the application performs the call, the result will be clearing only PL/SQL variables: leaving behind cursors, temporary tables, temporary LOBs, transactions, and database links, for example.

Yet another approach is for a DBMS broker (a component of DBMS or a mid-tier application) to keep track of whether the client-driver is to reset its session state. Because many requests share sessions, there needs to be an inexpensive and guaranteed method to share sessions without the risk of state leakage or knowledge of the states that are set.

BRIEF DESCRIPTION OF THE DRAWINGS

In the drawings of certain embodiments in which like reference numerals refer to corresponding parts throughout the figures.

DETAILED DESCRIPTION

Figure 1:
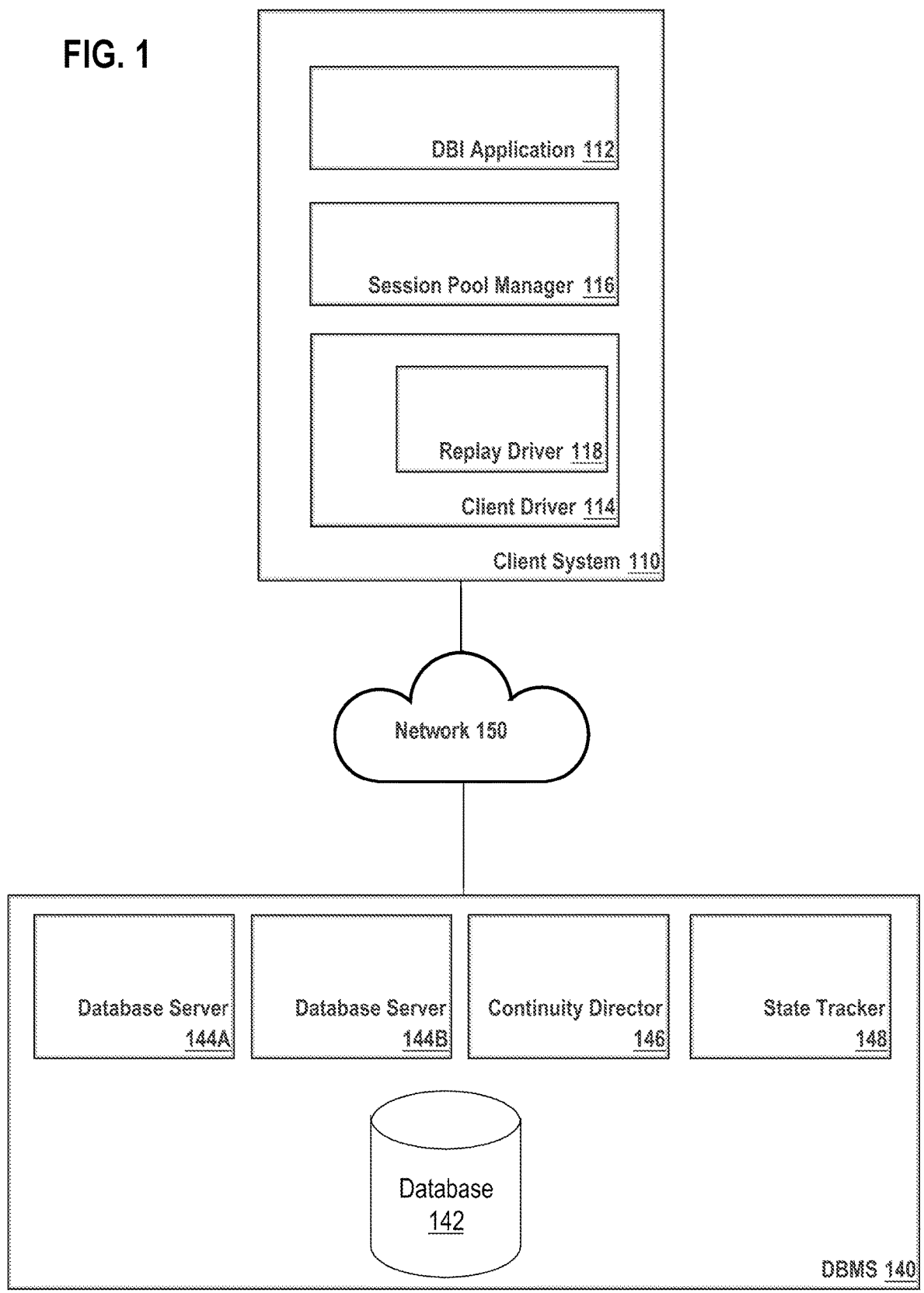
FIG. 1 is a block diagram that depicts a DBMS and a client computer system hosting DBI application interfacing with the DBMS, in one or more embodiments.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Applications that use connection pools as a conduit to interface with a DBMS lack the ability to automatically reset session state at the end of requests when connections/sessions are returned for reuse, and also to do so in a guaranteed manner, without affecting the application(s) using the session. The cleanup of leftover states in the session is left up to the developers of client applications, creating a high risk of session state leakage and, in some cases, even a transaction leakage between sessions.

Techniques are described herein for identifying, recording, and resetting the state of a database session and various aspects thereof. The database session state is maintained and modified on a database session between a database server and a client to set context and environment for the execution of commands over the session and to transmit the results thereof. To accomplish this, the system maintains one or more attributes of a database session state that describe various aspects of the state and affect the execution of the commands in the session.

Techniques are described herein to automatically and transparently track, restore, reset, and verify a session state, regardless of the techniques used to record and maintain an aspect of the session state. To do so, a DBMS may be configured to classify aspects of the session state based on whether an aspect can be restored if requested. An aspect may be further classified based on which actor maintains the session state information for the aspect. Non-limiting example classifications are:

a) client restorable—a client system of a DBMS maintains information about an aspect of the session state and is able to restore the aspect if necessary. For example, during a restore, the client system may issue commands to the new database server to restore the session state based on the stored information. For example, a client driver may store an aspect of the session state in the form of "ALTER SESSION" statement(s) in the replay context. When the commands in the replay context are replayed to a new database server, the "ALTER SESSION" statement(s) are also issued to the new database server to restore the aspect of the session state. Alternatively or additionally, client restorable attributes are included in one or more templates stored on the DBMS, which may restore them upon request.

b) server restorable—a system maintains information about an aspect of the session state. During a restore of a session state, the new database server may restore the aspect of the session state based on the stored information. The DBMS may store attribute-value pairs or session template(s) representing the aspect in the DBMS managed database.

c) non-restorable—an aspect of session state which is not restorable. The information about the aspect may be maintained on a DBMS and/or on a client system.

In an embodiment, after capturing one or more aspects of a session state at a particular point in a life cycle of the session, a summary of the session state is generated. The term "session state summary" refers herein to a data structure that includes a collective representation of multiple aspects of the session state. A session state summary may itself include multiple session state summaries, each such included session state summary describing a different set of aspects of the session state.

In an embodiment, a session state summary contains an indication of whether a modified state exists for any aspect of the session state. The term "modified state" refers herein to any session aspect's state that has been changed due to the execution of the client requested commands. The session state summary for a class of aspects of the session state may contain an indication of whether a change of state has occurred to any of the aspects of the class. For example, the session state summary for non-restorable aspects may contain an indication of whether any non-restorable aspect has a modified state.

Techniques are described herein to identify request boundaries in a session, and automatically reset the session state at a resettable point of the request boundaries. The term "request boundary" refers herein to a point in a lifecycle of a session at which an accurate execution of future commands within the session does not depend on the state of the session set by previously executed commands within the session. Conceptually, commands within the request boundary represent a logical unit of work requested by a client application and performed by a DBMS.

When an end request boundary is detected, the logical unit of work by the client has been completed on the DBMS. The term "resettable point" refers to the end request boundary, at which performing a reset of a session state will not corrupt the state of the DBMS after the reset. Thus, at a resettable point in the session lifecycle, the system may perform an automatic reset of the session state to safely guarantee that no state leakage between session reuses occurs for any client application. Similarly, the beginning of a request may also denote a resettable point, ensuring that the user command in the new request is safe from the state changes made by the prior usage of that session, within or outside of requests.

The reset of a session state may be based on configuration. The configuration specifies what type or specific session attributes the automatic reset is to be applied, and/or the specific attributes values to reset the session state attributes to. The reset of a session may be performed at different levels; each level denoting the extent of the session attributes/states that are reset. For example, at "LEVEL1 reset," all session attributes/states are reset, excluding database links. At the "LEVEL2 reset" example, the session reset also includes database links.

In an embodiment, the DBMS may be configured to make a determination itself as to which attributes to reset. For example, according to such a configuration, the DBMS may determine to reset the session state to the initial template of that session after authentication, and the login has completed. In another embodiment, the session state reset is isolated to the application-related states, as indicated in the reset configuration.

When the session state reset is enabled at the resettable point of the end request boundary, or beginning of request boundary, the session state is automatically reset on the database session by the DBMS, so that application-related session state does not leak across session reuses, in an embodiment. The session state reset is guaranteed, automatic, and fully independent of the application. Because the DBMS performs the session state reset, there is no way to circumvent this within a client application, further securing the client application. On the other hand, an application performed session state reset may expose the application to security vulnerabilities and inconsistency that may cause the session or future sessions to be unusable.

Through the use of session state tracking, state reset is future-proofed as the performance of the reset is not dependent on the application lifecycle. If the application changes (e.g., new version or new algorithm in the application), the session state reset continues to function as intended because the DBMS determines the session states that are set and when to reset the application-related session states.

Additionally or alternatively, the session state reset improves recoverability for the failover. The presence of the session state that is indicated as unrecoverable may prevent Transparent Application Continuity from enabling the recovery in the next requests. This is due to the initial state for a next request being undefined when the previous session state is unrecoverable. In an embodiment, to achieve a successful automatic failover, the initial session state, from which failover starts, has to be definite because otherwise, there is no guarantee that the session state of the new session, after the failover, may accurately replay the current request or future requests on that session. The reset of a session state after the end request clears (resets) the unrecoverable session state. Thus, unlike the state of the session without the reset, the state, when the new request is received, may be recoverable For example, a client application initiates a request for command(s) to be executed on a DBMS. The request carries end request and begin request markers indicating that the previous request is ending and a new request is starting. The DBMS detects the end request marker first and clears the state set in the previous request or session usage after that request, according to the configuration of the automatic reset. The application-related session state is cleared with no leakage before the next, new, request starts. The new request starts safely with new command(s) and unaffected by the previous request's application-related session states while reusing the same session. Accordingly, the application-related session state(s) in prior requests fail to leak to the next request(s), managed and guaranteed by the DBMS.

System Overview

FIG. 1 is a block diagram that depicts a DBMS and a client computer system hosting DBI application interfacing with the DBMS, in one or more embodiments. Client system 110 is connected to database servers 144A-B of DBMS 140 through network 150. Network 150 broadly represents a digital data telecommunications network comprising a communications network. Although a single client system 110 is depicted, other embodiments may include more client systems. Similarly, other embodiments may include more or fewer database servers 144A-B and database 142.

In an embodiment, DBI application 112 is an application server, a mid-tier database application, and/or any other database-backed application that executes on computing devices of client system 110.

In an embodiment, DBI applications may interface with a DBMS using a Client-Driver on the client system. For example, client system 110 includes DBI application 112 that interfaces with DBMS 140 using Client-Driver 114. Client-Driver 114, in this example, may utilize session pool manager 116 for connection with DBMS 140. Client-Driver 114 may interface with network interfaces of client system 110 to establish a connection with DBMS 140. Client-Driver 114 may communicate with DBMS 140 using database native calls. Session pool manager 116 and/or DBI application 112 may communicate with DBMS 140 by issuing driver-specific calls to Client Driver 114, which would translate the calls into native calls to DBMS 140 over one or more established connections. Although session pool manager 116 is depicted in FIG. 1 as being separate from Client Driver 114, in other implementations, session pool manager 116 may be part of Client Driver 114. The techniques described herein similarly apply to session pool manager 116 whether or not session pool manager 116 is part of Client Driver 114 or separate from Client Driver 114.

In an embodiment, DBMS 140 may itself initiate a communication (notification) with the client driver 114 to cause a particular action to be performed by client system 110. For example, a disconnection-requiring planned operation may be initiated for database server 144A, and one or more services of database server 144A may be migrated to another instance of the same database 144B by DBMS 140 or to another database that can offer the same service. DBMS 140 may issue one or more database events regarding the planned operation to the connected database client drivers of client systems. Client-Driver 114 may receive and parse such an event. An example of such events is FAN events.

Application Continuity System (Application Continuity) provides for session continuity of established sessions of a client system with a DBMS for planned and unplanned disconnection events. Application Continuity includes one or more components of the DBMS and the client system such as one or more components of DBMS 140 and client system 110.

Resettable Point

Techniques described herein generate an environment that resembles a brand new session without the computational cost of creating a brand new session for each request. In an embodiment, on receipt of an explicit end request (or begin request or any delineation of a request) and optionally determination of implicit begin or end request, DBMS 140 clears one or more session attribute of the session states (and in some embodiments, all of the session state attributes). DBMS 140 may verify whether the session is indeed at a point in the lifecycle at which a reset of the session may be performed. Based on the verification, DBMS 140 may invoke a state clearing function for each session state attribute to be cleared according to the configuration for the session reset.

Figure 2A:
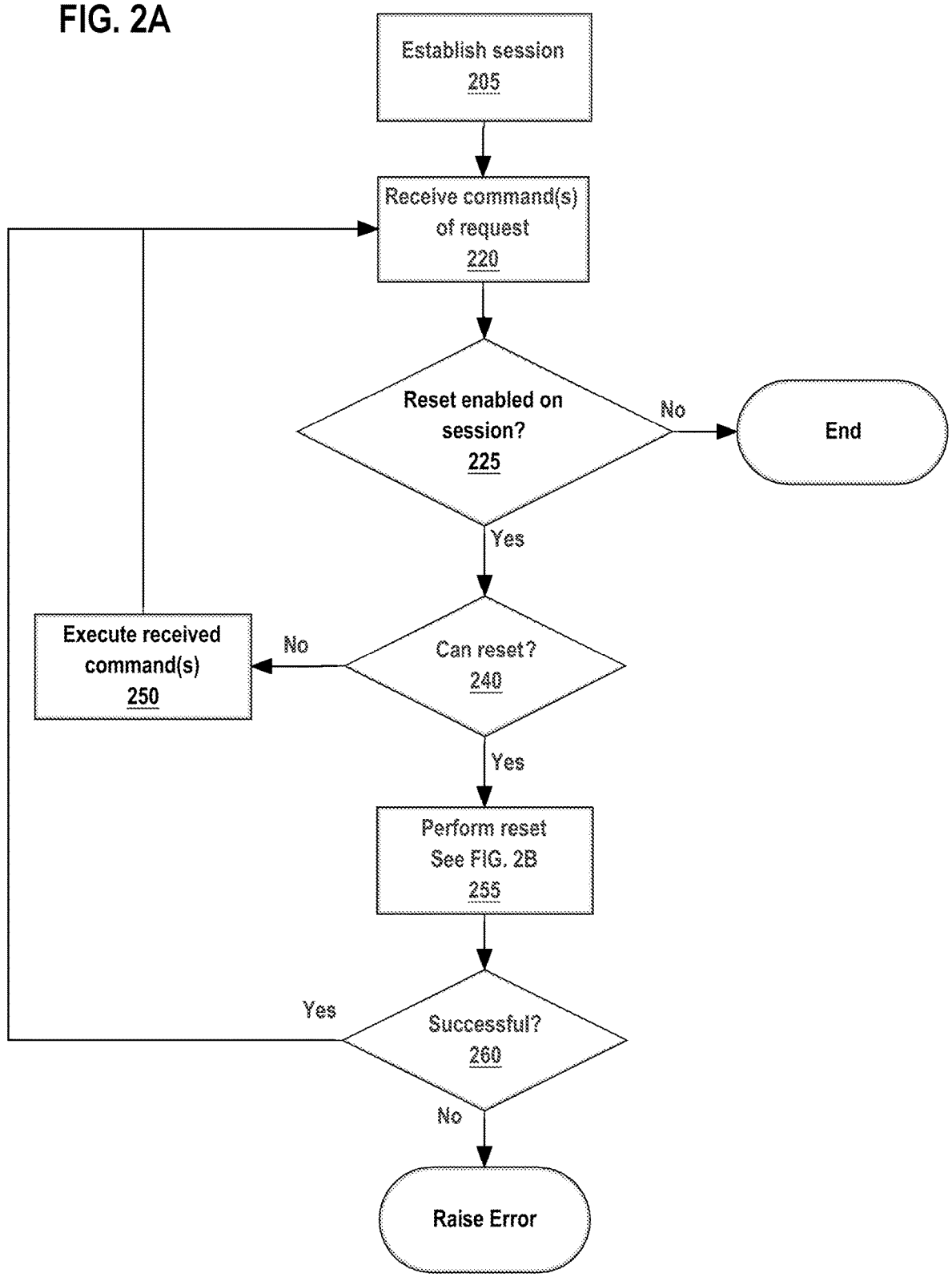
FIG. 2A is a flow diagram that depicts a process for identifying a resettable point in a session lifecycle for automatically performing a reset, in one or more embodiments.

FIG. 2A is a flow diagram that depicts a process for identifying a resettable point in a session lifecycle for automatically performing a reset, in one or more embodiments. At step 205, client system 110 establishes a session with DBMS 140. At the establishment of the session, the session may authenticate with DBMS 140, thus indicating to DBMS 140 an initial point in the session lifecycle. For example, DBMS 140 may receive a user login trigger to indicate the initial point of the session lifecycle.

At step 220, DBMS 140 starts receiving and processing one or more database commands of request(s) from DBI application 112 over the session. Each request includes one or more commands to execute on DBMS 140, execution of which on DBMS 140 affects the state of the session. Commands executed in the context of the session may continuously cause various aspects of the application-related session state to change. Thus, the values of the corresponding session attributes may change as well to reflect the change in the session state.

At step 225, DBMS 140 determines whether the reset is enabled for this session. If the reset is enabled, DBMS 140 monitors for boundaries within the database commands received over the session to identify a resettable point in the session.

If no resettable point is identified for the received command(s) at step 240, then the process proceeds to step 250 to execute the received commands. The process repeats for the next received command(s) at step 220.

Implicit Request Boundary

In an embodiment, at step 240, the session state tracking detects an implicit request boundary in a lifecycle of a session. The implicit request boundary may be the resettable point at which the session state may be reset without any adverse effect on the future results. Using the session tracker 148, DBMS 140 may obtain the session state of a session at any point in the session's lifecycle. Doing so, DBMS 140 may determine that the session is at an implicit request boundary, a request boundary discovered by the system without any explicit indication from the client application.

To identify an implicit request boundary, the DBMS 140 determines whether any non-restorable session state summary has a modified state. The modified state of the client-restorable and server-restorable session state summaries for the session does not preclude the identification of an implicit request boundary, in an embodiment.

When a non-restorable session state summary has a modified state, no implicit boundary has been identified. The non-restorable session state may be caused by an object represented by one of the attributes in the non-restorable session summary containing information. If such an object is instantiated in the previous request and persists in the next request, a session state leak may occur.

However, additional received commands may have modified the previous session state captured that had a non-restorable modified state. For example, as part of the execution of the commands, the temporary table(s) allocated for the previous commands are de-allocated. Thus, session tracker 148 indicates that no modified state exists for the "Session Duration Temporary Tables" attribute. Table 1 depicts an example list of attribute-value pairs and their metadata after state tracker 148 completes performing callbacks to DBMS components to determine the corresponding states:

TABLE 1

Example list of tracked attributes

| Name | Classification | State Exists? | New Value |
|---|---|---|---|
| NLS_LANGUAGE | Client restorable | Yes | 5 |
| NLS_CALENDAR | Client restorable | No | |
| NLS_DATE_FORMAT | Client restorable | No | |
| SECURE_ROLES | Server restorable | No | |
| APPLICATION_CONTEXT | Server restorable | Yes | 7 |
| PLSQL Global Variable | Non-restorable | No | |
| Session Duration Temporary LOBs | Non-restorable | No | |
| Session Duration Temporary Tables | Non-restorable | No | |

The session state summary for each classification reflects the existence of modified states, as depicted in Table 2.

TABLE 2

Session State Summaries per Classification

| Classification | Has State? | Signature |
|---|---|---|
| Client restorable | Yes | 5 |
| Server restorable | Yes | 7 |
| Non-restorable | No | |

After the execution of the commands in the previous example, the non-restorable session summary has no modified state. While client and/or server restorable summaries may continue to have modified states, DBMS 140 may identify that the session is at an implicit request boundary, and a reset may be performed to the session.

Explicit Request Boundary

In an embodiment, DBMS 140 determines that a request boundary is present without detecting an implicit boundary, at step 240. Rather, explicit boundary marker(s) are detected within a request and indicate that the request is at the end request boundary. In such an embodiment, unlike an implicit request boundary, the end request boundary is explicitly requested by DBI application 112. The application 112 embeds request boundaries to indicate the pieces of work requested for DBMS 140 to perform that are independent of each other.

The request boundary may be received with the first call of the database request or the last call of the database request as a piggyback, for performance reasons. For example, application 112 may process a client request by initiating transaction(s) and requesting database commands to be performed by the DBMS. When the application has finished processing the client request and is ready to respond, the application may send to the DBMS an end of request boundary on the last call of the request, standalone, or the first call of the next request, as an indication that the request has ended.

In one embodiment, application 112 is configured to issue a beginning request boundary when application 112 is about to start a new unit of work that may require the database interface to invoke database commands. When using request boundaries, the application 112 also issues an ending request boundary, at a logical point at which application 112 has finished performing the unit of work over the connection and does not expect to invoke the database interface for that unit of work. In an embodiment, when a request boundary is issued, a request boundary marker, such as "beginRequest" or "endRequest" for start and end of a new unit of work, is inserted into a database command sent to the client driver 114.

Since the logical unit of work is associated with application 112's borrowing and returning from connection pools, at the end or before the beginning of such a borrow from the connection pool, database client driver 114 may assume that a request boundary has been reached by application 112 and communicate the request boundary to DBMS 140. In another embodiment, DBMS 140 may embed request boundaries. In such an embodiment, the client driver of application 112 will propagate the request boundaries to DBMS 140. DBMS 140, as part of its monitoring, will detect the beginning request boundary and/or the ending request boundary.

In an embodiment, a request boundary may be accompanied by the last one or more database commands for the particular database request. In such an embodiment, client driver 114 or DBMS 140 may not determine that a request boundary is detected on the connection until the response from DBMS 140 is forwarded to application 112. Client-Driver 114 may attempt to reset the database session with DBMS 140 because a request boundary, denoting the end of the database request, was detected, and the response was received.

When a client of an application initiates a request for work with the application, the request boundary may be detected by client driver 114 and/or DBMS 140, indicating that the application is initiating a new request from the client. Database client driver 114 or DBMS 140 may monitor for request boundaries from the application 112 to detect the request boundaries at step 20.

Verifying Resettable Point

In an embodiment, DBMS 140 verifies that a request boundary has been indeed identified, and the session state may be safely reset. Resetting the session state at a point in the session lifecycle that is not a resettable point may have adverse repercussions on the future use of the session, such as corruption and leakage. For example, a reset of the session that has an open transaction may corrupt the database when the transaction commits or may leak the transaction details to the next request. If a request boundary has been indeed detected, the transaction should have committed or rolled back; request boundary should not exist with an open transaction.

In one embodiment, if any transaction is open, at step 240, the process determines that no resettable point has been detected. The process proceeds to step 250 to execute the received commands. In another embodiment, if any transaction is open, DBMS 140 may perform a rollback of any open transaction. If the rollback(s) are successful at step 240, then a resettable point for the session state has been identified, and the process proceeds to step 255.

Session Reset Configuration

Figure 2B:
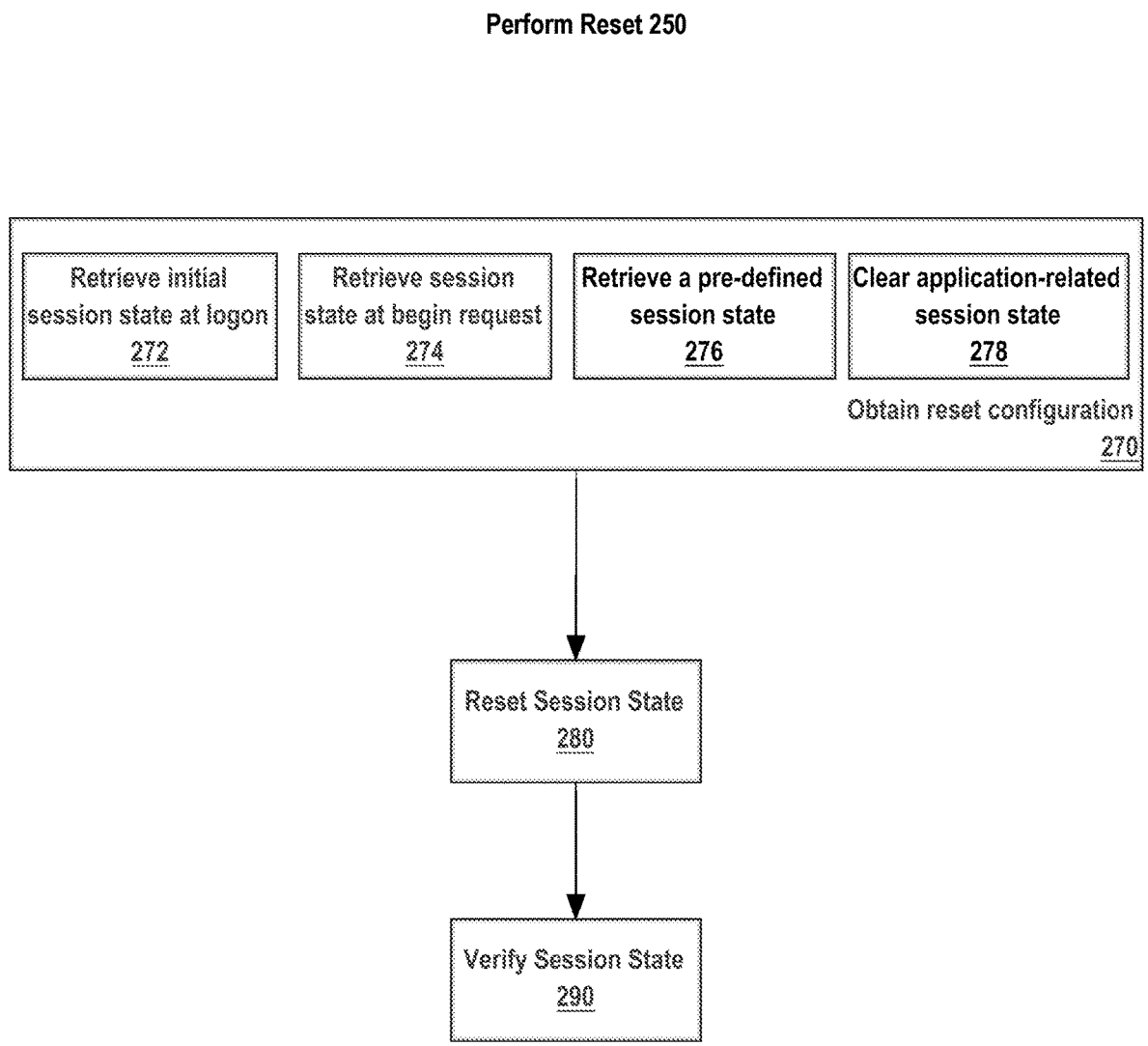
FIG. 2B is a flow diagram that depicts a process for performing a reset of a session state, according to one or more embodiments.

FIG. 2B is a flow diagram that depicts a process for performing a reset of a session state, according to one or more embodiments. In an embodiment, the process may perform one or more of the steps depicted in FIG. 2B to perform the reset.

At step 270, DBMS 140 may obtain the configuration for performing a reset. Depending on the configuration for the session or the lack thereof (default configuration), the process may execute one or more of the example sub-steps, each representing a configuration option for a reset of a session state:

a. As one example, at sub-step 272, the process retrieves reset configuration based on the initial session state established at logon by DBMS 140 and/or application 112. The session state is (at least partially) captured at the login trigger for the session using the session state tracking techniques. In an embodiment, to save a partial or full snapshot of the initial session state, a session template is generated from the values of session attributes after the session is authenticated and after the logon trigger, but before any requests or commands are received. Such a template serves as a reset template for the session. With this embodiment, there is no need, and it is undesirable to repeatedly capture any other session state throughout the lifecycle of the session.

b. As another example, at sub-step 274, the process retrieves reset configuration based on the session state at the begin request boundary. Using the session state tracking techniques, the session state is (at least partially) captured at each begin request boundary to be reset at the corresponding end request boundary. In an embodiment, to save a partial or full snapshot of the begin request session state, a session template is generated from the values of session attributes at or after the begin request boundary is received (or detected) before any commands for the request are received. Such a template serves as a reset template for the session.

c. As another example, at sub-step 276, the process retrieves reset configuration based on a pre-defined session state. The reset configuration contains the configuration for session attributes that is associated with the session. In an embodiment, the predefined session state may be maintained as a session template and serves as a reset template for the session.

d. As another example, at sub-step 278, the process retrieves reset configuration that may indicate a reset of the session state by clearing application-related session states and application cursors. In such an embodiment, a reset occurs of a defined set of non-restorable session state attributes. Thereby, the reset clears the application-related unrestorable-session states and open application cursors. Other session states may be kept unchanged by this reset level. This option may serve as a default session reset configuration to ensure that a minimal reset is performed not to leak named session states and allow Transparent Application Continuity to re-enable as unrestorable states are cleared.

In an embodiment, the reset configuration for a session is specific to the application using the session. For example, application 112, when checking out session from session pool manager 116, may request client driver 114 to declare the session to be of a particular class. DBMS 140 may perform the reset of the session according to the reset configuration associated with the class. If no class exists for the session or DBMS 140 does not support the classification of sessions, a default reset configuration may be used for the session reset.

The configuration (initial, default, or class-based) may be based on levels that indicate which type of session attributes and to what values the session attributes are reset to. In an embodiment, the configuration may specify one or more session templates to be applied for the reset. Additionally or alternatively, the configuration may specify that the reset is to be performed on the granularity level of attributes and may further specify which attributes to apply the default or initial attribute values to reset the session. When using templates, most deployments will use the session state template captured after logon.

Performing Session Reset

Referring to FIG. 2, at step 280, based on the session reset configuration, the DBMS 140 proceeds to reset the session state at the identified resettable point in the session lifecycle.

Resetting the session includes resetting one or more of the session attributes. The attribute values to which the session attribute(s) are reset may be the attribute values captured in the last session summary of the session (that is at the last user call in that session) or to a template captured after logon for that session.

In an embodiment, the session states that are used across multiple sessions, such as a subset of global variables, are not reset as part of performing the session state reset. For example, the global variable(s) describing the context for DBMS 140, such as global SYS CONTEXT, is not cleared as all sessions use it.

When the reset is performed at an implicit request boundary, the session state is guaranteed to have no modification state for the unrestorable attributes. Thus, no session objects interfere with the reset or with the future re-use of the reset session. Unlike the implicit request boundary, the session state for a resettable point based on the explicit end request boundary may contain a modified state for non-restorable session attribute(s), and the corresponding objects associated with the non-restorable session attributes may remain instantiated.

For an explicit end request boundary, in an embodiment, DBMS 140 deallocates/truncates one or more session-associated objects (including those corresponding to the non-restorable attribute(s) of the session) as part of performing the session reset. For example, DBMS 140 may determine whether any open cursor(s) exist in the session at the explicit end request boundary. If no ongoing requests are performed within the session, no cursors should be open. DBMS 140 may force the closure of application-related cursors at explicit boundaries. Similarly, if any database link exists, DBMS 140 may also close the existing database links based on the RESET option selected. DBMS 140 may further clear application-related session duration temporary lob(s) and/or application-related session duration temporary table(s) of the session state at the explicit end request boundary if any is instantiated. Client applications should not be accessing application-related session duration temporary tables and/or application-related session duration lobs across explicit request boundaries Additionally, the resetting of the session state may include truncating or making inaccessible application-related session duration LOB(s) that have survived the explicit end request. In an embodiment, secure roles of the session state are not reset.

In an embodiment, at step 290, DBMS 140 may verify that the session state has been reset successfully at step 280. After the reset of the session state, DBMS 140 may invoke state tracking to capture the state of the session at the point after reset but before any new commands are received with a new request.

Depending on the reset configuration option in use, at step 270, the newly reset session state summary for the session is verified. For example, when the session reset configuration is obtained according to sub-step 278, the unrestorable states are cleared, and server/client restorable states are not altered at step 280. Therefore, the process may verify that the unrestorable session summary has no modified state at step 290, and if so, the reset was successful at step 260 of FIG. 2A. Otherwise, the process may raise an error.

As another example, when the session reset configuration is obtained according to sub-step 272, the reset may be verified at step 290, if the template signature(s) after resetting the session state matches the initial session state template for the session. Similarly, for the example of sub-step 274, the begin request boundary template signature(s) matches the current session template sign, if the verification at step 290 is successful at step 260 of FIG. 2A. The session configuration for sub-step 276 may have a template generated for the pre-defined session state, which may similarly be compared with the current session template to determine a successful outcome at step 260 of FIG. 2A. In an embodiment, the process may raise an error if a mismatch of templates occurs.

Session State Tracking: Session Attributes

Session attributes correspond to session parameters and fields that affect/define an aspect of the session state. There are session parameters that client system 110 itself maintains in addition to DBMS 140. The term "client-restorable attribute" refers herein to a session attribute-value pair, which is maintained by a client system locally. Accordingly, client-restorable attributes are configured so that their respective current values are stored on client system 110. For example, client restorable attributes may be set by client-driver 114 when initiating a session from session pool manager 116 with DBMS 140.

In an embodiment, client-restorable attributes may be set or reset either by client system 110 or by DBMS 140 or both. Regardless of which component sets the value of a client-restorable attribute, client system 110 receives a notification of the new value and maintains the new value locally. Client-restorable attributes may describe session information about DBI application 112, client driver 114, and DBMS 140. Table 3 below provides non-limiting examples of client-restorable attributes:

TABLE 3

Example of client-restorable attributes

| Name | Description |
|---|---|
| ACTION | Identifies the position in the module (application name) |
| LANGUAGE | The language and territory currently used. |
| NLS_CALENDAR | The current calendar of the current session. |
| NLS_DATE_FORMAT | The date format for the session. |
| NLS_SORT | Binary or linguistic sort basis. |

TABLE 3-continued

Example of client-restorable attributes

| Name | Description |
|---|---|
| CURRENT_SCHEMA | Name of the default schema being used in the current schema. |

The term "server attribute" refers to a session attribute that is not maintained by a client system but only by the DBMS with which the client system has established the session. Although a server attribute is maintained by a DBMS, in some embodiments, a client system sets/resets a server attribute using the "ALTER SESSION" command without maintaining the newly set value locally. Server attributes may also be modified by the execution of database commands on the DBMS. Another set of server attributes may remain static (unmodified) throughout the session. Server attributes are further classified into server restorable attributes that can be restored by the DBMS and/or based on a request from a client driver, and non-restorable attributes which cannot be restored based on a request but may be restored by the execution of the appropriate commands that affect the corresponding aspect of the session state.

TABLE 4

Example of server attributes

| Name | Description |
|---|---|
| AUTHENTICATED_IDENTITY | The identity used in the authentication |
| AUTHENTICATION_DATA | Data being used to authenticate the login user |
| DB_NAME | Name of the database |
| MODULE | The application name (module) |
| NETWORK_PROTOCOL | Network protocol being used for communication |
| INSTANCE | The database instance identification number of the current instance. |
| DBMS_LOB | Temporary large object(s) (LOBs). |
| TEMPORARY_TABLE | Temporary table(s). |
| CONSTRAINTS | A constraint is a rule to which data must conform. |
| USE_STORED_OUTLINES | Stored execution plan to retrieve from cache. |
| OPTIMIZER_MODE | Behavior for choosing an optimization approach for the instance. |

Figure 3:
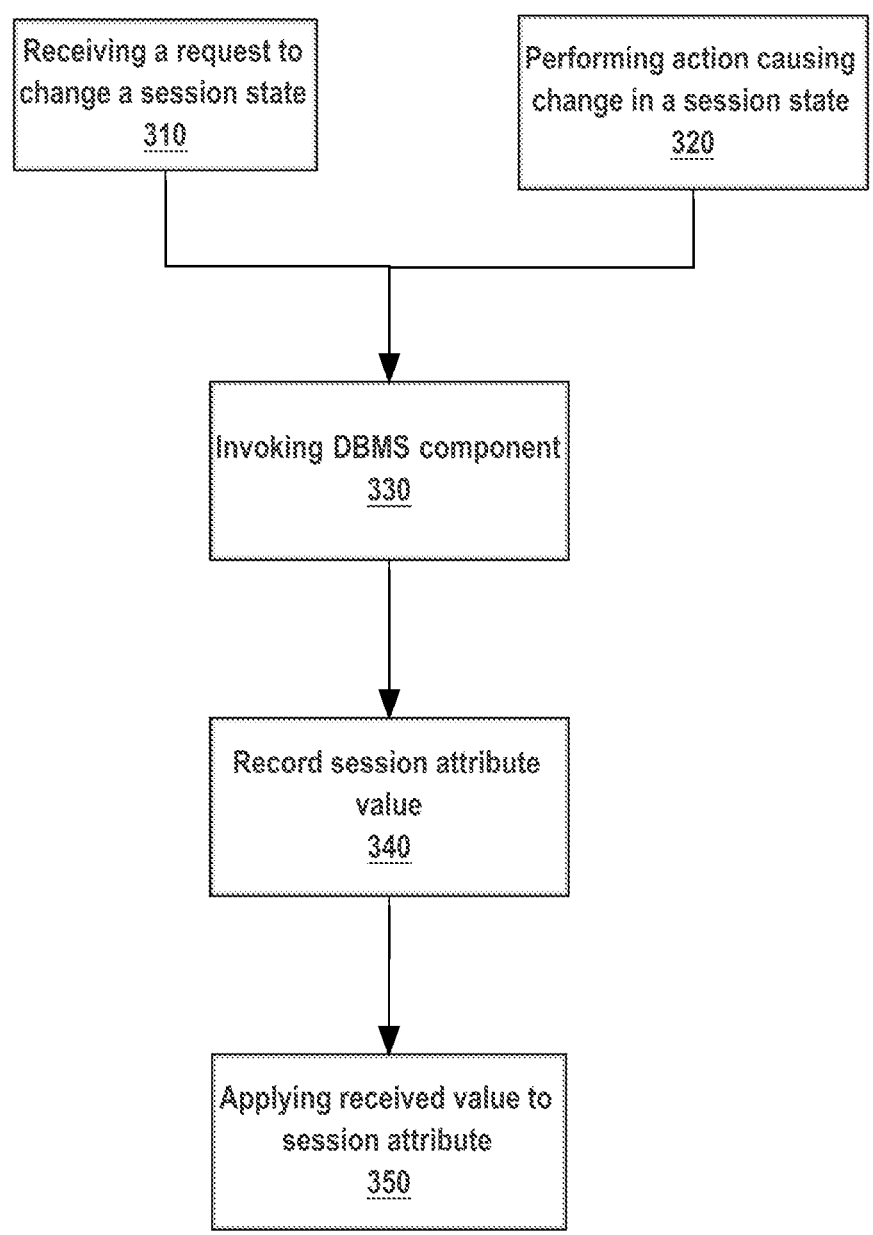
FIG. 3 is a flow diagram that depicts a process for modification of a session attribute, in an embodiment.

FIG. 3 is a flow diagram that depicts a process for modification of a session attribute, in an embodiment. Client-restorable and server session attributes may be set through declarative or procedural mechanisms. At step 310, DBMS 140 receives an explicit request to modify an aspect of the session state. Such a request may be in the form of the "ALTER SESSION" command over the session or by explicitly setting a session attribute on the session object representing the session by session pool manager 116. The session object may be synchronized or copied over from client driver 114 to DBMS 140's corresponding session object causing DBMS 140 to receive the request. Examples of attributes that are set by declarative mechanisms are LANGUAGE, NLS_DATE_FORMAT, and so on. Alternatively or additionally, at step 320, the performance of certain commands (such as PL/SQL procedures that populate global variables, LOB processing, and AQ processing) may cause modification of session attribute(s).

At step 330, DBMS 140 identifies and invokes the corresponding component that is tasked with maintaining the aspect of the session state for which the session attribute is modified. The component performs a call back into continuity director 146 at step 340, and at step 350, continuity director 146 applies the received value in the call back to the session attribute.

Session State Tracking: Session Templates

The "Session template" term refers herein to a set of session attributes values at a point in a lifecycle of a database session. Each session attribute describes a particular aspect of a session state that affects the execution environment for commands. The value of the session attribute may change at different points of the session lifecycle, thus representing the corresponding aspect of the session state at that point. A session template is immutable as it partially (or in some embodiments, wholly) represents a snapshot of a session state at a particular point of the lifecycle of the database session.

In one usage, to save a partial or full snapshot of a session state, a session template may be generated from the values of session attributes. This is done after the session is authenticated and after the logon trigger. This will be the RESET template. In more common usage, no template is needed as a reset will be performed on named application-related unrestorable states and open application cursors.

There may be different types of session templates that include different types of session attribute-value pairs. DBMS 140 may be configured to select which session attributes to include in which type of session template, in an embodiment. For example, the client-restorable attribute-value pairs that are sent from client system 110 to DBMS 140 may be used in a client-restorable typed template. For the client-restorable attributes, since the session attribute-value pairs are sent from client system 110 itself, the DBMS 140 is aware that the aspect of the session state that those session attributes represent is important for DBI Application 112, and thus is to be stored in a client-restorable session template.

In one embodiment, state tracker 148 monitors which client-restorable attributes' values have been modified during the lifecycle of a session and generate client-restorable session template(s) that include only those modified session attributes. A base template is maintained that includes default values for client-restorable attributes. The base template can be applied across multiple sessions and for any point in a lifecycle of a session. When any of those client restorable attributes are changed at a point in a lifecycle of the session, the DBMS 140 generates a template that includes only for modified client-restorable attributes. The advantage of this approach of generating templates for only modified attributes is a reduction in a number of attribute-value pairs in client-restorable session templates and thus saving considerable storage space given the frequency and number of sessions that a DBMS handles.

Another type of session template is a server template that includes a number of server attribute-value pairs that are maintained only by a DBMS. The number of the server attributes, which are modified throughout the lifecycle of the session, is expected to be relatively small. While it is possible for different database servers to have different underlying values for the non-modified server session attributes, those attributes are not critical to the behavior of DBI application 112. Otherwise, client system 110 would behave differently depending on which database server the session was to be established. Accordingly, in an embodiment, the static server attributes are excluded from server templates to further save storage space.

Server templates and client-restorable templates together may describe a complete session state. Multiple session templates that have been generated and stored for the point in a lifecycle of the session may represent the relevant aspects of a session state at that point.

Additionally or alternatively, a session state is described via a hierarchal set of session templates. In one embodiment, session attributes that are less likely to be modified throughout the lifecycle of the session are grouped at a different (lower) level session template(s) of the hierarchy. On the other hand, the more frequently modified session attributes (higher-level) are grouped into a higher level of session template(s). This way, session template(s) at a lower level maintain a constant (unmodified) set of attributes for longer periods of time than templates at a higher level. Thus, a new point in a lifecycle of a session may be described by generating a higher-level session template with frequently changing session attributes without generating a new session template(s) of a lower level in the hierarchy. In another embodiment, the levels in the hierarchy are reversed. Regardless of which is considered a lower or higher level of session template, this technique improves the storage efficiency of session templates by avoiding replication of non-modified session attributes as part of saving the session state for each point in the session lifecycle.

Session State Tracking: Session Template Generation

Figure 4:
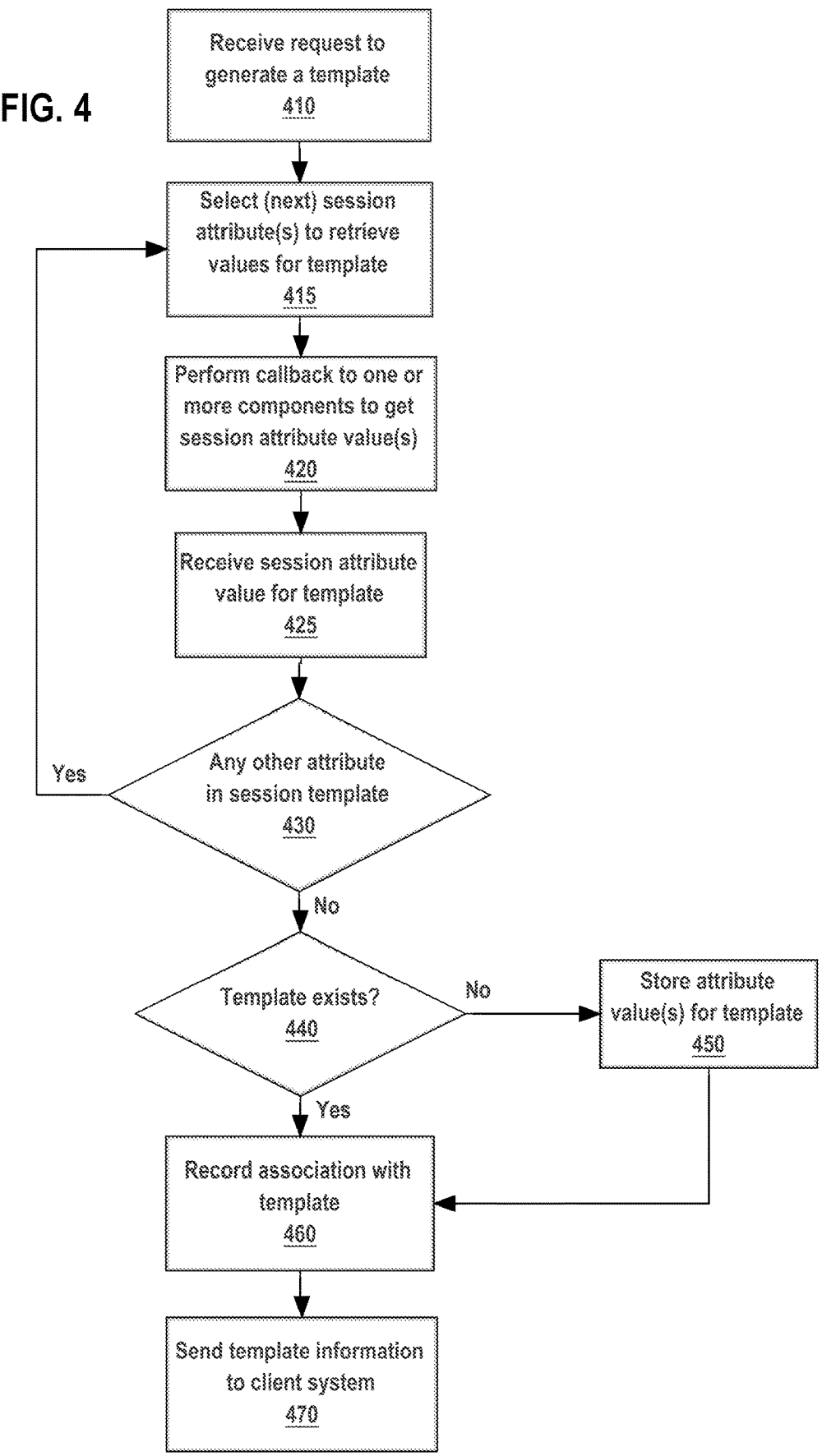
FIG. 4 is a flow diagram that depicts a process for generating a session template, in an embodiment.

FIG. 4 is a flow diagram that depicts a process for generating a session template, in an embodiment. At step 410, a request is received to generate a template. The request may be generated for capturing a session state at a point in a lifecycle of the session and/or based on a request received by client-driver 114. For example, each of the multiple-type session templates may be requested to be generated at the initiation of a session. Thus, any session would have a known initial session state represented by the one or more generated session templates.

Additionally or alternatively, the request for a generation of a template may be received when one or more attributes of the session template are detected to be modified. For example, a client call may include "ALTER SESSION" statements modifying various attribute-value pairs of session aspects. State tracker 148 may determine whether any of the sent attributes have changed and, based on the determination, request the generation of one or more session templates of the affected session attributes. In another embodiment, state tracker 148 may assume that any client-restorable session attribute sent by client driver 114 indicates a change in the corresponding aspect and a new session template that includes the attribute is to be generated.

To generate a session template, at step 415, state tracker 148 identifies the session attributes that are part of the session template and iterates through the one or more identified session attributes.

At step 420, for a selected session attribute of the identified session attributes, state tracker 148 performs a callback (a programmatic request) to the DBMS 140 component that is associated with the selected session attribute to retrieve the attribute value, in an embodiment. At step 425, the component returns the attribute values. In one embodiment, if the change in the value of the selected session attribute is the one, which has caused the process for the generation of the session template, then state tracker 148 may use the available changed value instead of performing a call back for that particular session attribute.

At step 430, a determination is made whether any other attribute remains to be processed. If so, the process returns to step 415 to select the next session attribute. Otherwise, the process proceeds to step 440.

At step 440, state tracker 148 checks whether a session template with the same session attribute-value pairs exists. By performing the check, state tracker 148 avoids superfluously storing replicas of session templates. If a session template of the same session attribute-value pairs exists, then, at step 460, state tracker 148 records association between the already stored existing session template with the session's lifecycle point for which the session template was requested to be generated.

Session State Tracking: Storing Session Templates

At step 450, a session template may be stored in fast-access volatile memory in addition to or in place of storing the session template persistently on non-volatile memory such as disk storage. Session templates are identified in the memory based on session template identifiers. In one embodiment, session templates are stored in a hash table data structure stored in the fast-access memory, and the hash values of the table uniquely identify the stored templates, in one embodiment. The session template identifier, at step 440, is used as a lookup into the hash table to determine whether the same value session template identifier exists. If so, state tracker 148 already has stored the same session template into memory, and the process proceeds to step 460. If not, the session identifier is added to the hash table in association with the list of attribute-value pairs. The hash table improves the speed of matching new session templates with existing session templates.

In another embodiment, a session template identifier is independent of the session attribute-value pairs of the session template. In such an embodiment, to determine whether a replica of the generated session template is already stored, a separate signature is generated based on attribute-value pairs of the generated session template and compared with the similarly generated signatures of stored templates. Additionally or alternatively, each attribute and its value of the generated session template is compared with the previously stored session templates.

If the determination is made that the new template does not exist in the table at step 440, then the template is stored both in the persistent storage and materialized in fast access volatile memory at step 450. Each template will have a retention period based on the time of the last use, and old templates will eventually be purged from the table. If a purged template is later requested, an error will be returned to client driver 114.

Continuing with FIG. 4, after state tracker 148 stores a generated session template or identifies a pre-existing template for the retrieved session attribute-value pairs, state tracker 148 sends the template's identifier to client driver 114. Client driver 114 maintains the template identifier in association with the recorded commands requested over the session for which the template was generated. Accordingly, client driver 114 maintains the session state for the played commands.

Session State Tracking: Initiating Session State Capture

Using session templates or other data structures, the DBMS 140 records and maintains the state of a session from its inception through its lifecycle. The initial session state is generated when DBI application 112 initiates a new session to execute one or more database commands, in an embodiment. In another embodiment, the initial state is generated when DBI application 112 invokes client driver 114's interface to indicate a request boundary in DBI application 112's lifecycle. Accordingly, whether through an interface or by establishing a new session, client driver 114 gets an explicit indication that a new initial session state is to be established with DBMS 140.

As part of the establishment, client driver 114 may be configured to initialize the state of the session. DBI application 112 may have registered callbacks for client driver 114 to invoke to receive initial values for aspects of the session state. For example, once the application-preferred language or time and date settings are received, client driver 114 may issue "ALTER SESSION" statements to initialize the language or time and date settings for the session. Client driver 114 detects initialization of the session and identifies this point in a lifecycle of the session as an initial request boundary for the session, in an embodiment. Client driver 114 stores any initial session state setting commands in the replay context for the initial request boundary. Client driver 114 initiates a capture stage, in which any command sent over the session is recorded in the replay context.

In an embodiment, an initial state of a session is multiplexed when the session is checked out of the pool. The session pool may maintain sessions with pre-configured states. The pre-configured states may be represented by associated one or more templates and/or attribute-value pairs. Accordingly, in such an embodiment, the pre-configured state of a session in the pool is associated with a session state signature representing the initial state of the session.

The application 112 seeking a certain initial state, when checking out a session from the pool, provides a signature for the desired initial state at the checkout of a session from the pool. Rather than initializing such a state on any available session from the session pool, the session pool determines whether a session with a matching signature for the initial session state already exists in the session pool. If so, the session pool provides the identified session avoiding spending computer resources on the initialization of the session as described above.

In an embodiment, the initial state, at least in part, is stored in a session template, and the session pool is pre-configured to apply the session template to one or more sessions in the session pool before checkout of the sessions from the pool. In such an embodiment, the pool is provided with a template identifier for the desired initial state and, in response, provides a session with the corresponding template already applied and, therefore, having the desired initial state.

In an embodiment, an explicit template may be used to apply an initial state to a session. The term "explicit templates" refers herein to a named template that is generated in response to a request a client application, such as client application 112. In an embodiment, DBMS 140 provides user controls to a database administrator to generate and configure an explicit template. Client application 112 may request for the generated explicit template to be used when for initializing an initial state on a session from a session pool. In doing so, client application 112 avoids issuing "ALTER SESSION" and more cumbersome and computer resource intensive callbacks to execute queries to complete the initialization.

In a lifecycle of a new session, a new initial session state is established with DBMS 140. DBI Application 112 may request session pool manager to retrieve a session from a session pool to connect with DBMS 140.

In another embodiment, the session may already be established, and the DBI application issues a request to execute commands to client driver 114. DBI application 112 is configured to issue a beginning request boundary when DBI application 112 is about to start a new unit of work that may require the database interface to invoke database commands. When using request boundaries, the DBI application 112 also issues an end request boundary at the logical point at which DBI application 112 has finished performing the unit of work over the connection and does not expect to invoke the database interface for that unit of work. In an embodiment, when a request boundary is issued, a request boundary marker, such as "beginRequest" or "endRequest," for start and end of a new unit of work, is inserted into a database command sent to client driver 114. Since the unit of work is associated with application 112's work cycle, at the end or before the beginning of such a cycle, database client driver 114 may assume that a request boundary has been reached by application 112.

Client driver 114 or DBMS 140 may detect request boundaries by monitoring for the application opening, and closing pooled connections or other techniques described herein. For example, DBMS 140 may detect a request boundary when client driver 114 of DBI application 112 propagates a suggested request boundary to DBMS 140 or may apply heuristics to identify a request boundary. DBMS 140, as part of its monitoring, detects the beginning request boundary and/or the end request boundary and indicates to client driver 114 that the request boundary has been reached.

Session State Tracking: Detecting Change in Session State

DBMS 140 and/or client driver 114 may generate a session state summary at an arbitrary point in a lifecycle of a session. In one embodiment, DBMS 140/client driver 114 captures the session state of a session with client system 110 at each roundtrip and generates a session state summary. One or more aspects of the session state may be captured by DBMS 140 in the form of one or more session templates, individual session attribute-value pairs, and/or objects. The techniques described below are applicable to any form of the capture of change in a session aspect. In the example, the database may store templates that describe the session state and share a template key to client driver 114.

In an embodiment, session state tracker 148 detects any change to one or more aspects of a session state. When DBMS 140 receives a set of commands from client driver 114, the set of commands itself either contains explicit changes to one or more of the state aspects and/or the execution of the set of commands causes changes to the one or more of the state aspects. For example, the set of commands received from client driver 114 may include an "ALTER SESSION" command that explicitly alters a particular aspect of the session state (e.g., updates language, time/date). As another example, the set of commands may (additionally or alternatively) contain commands that create a large temporary object (LOB) and thus also alters that particular aspect of the state. Such changes to a session aspect are recorded into a session state summary. They are sent individually or as part of the session state summary to client driver 114 for storage in a replay context, in one embodiment.

Furthermore, the same set of commands that has commands that have implicitly or explicitly affected an aspect of the session state may also include a command that removes the effect of such a command. As a continuation of the above example, the set may include another "ALTER SESSION" command that changes a session attribute value back to the original value and/or may contain a command that de-allocates the temporary LOB. Accordingly, a change to a session aspect that occurred during an execution of a set of commands may be reverted by the same set of commands.

Figure 5:
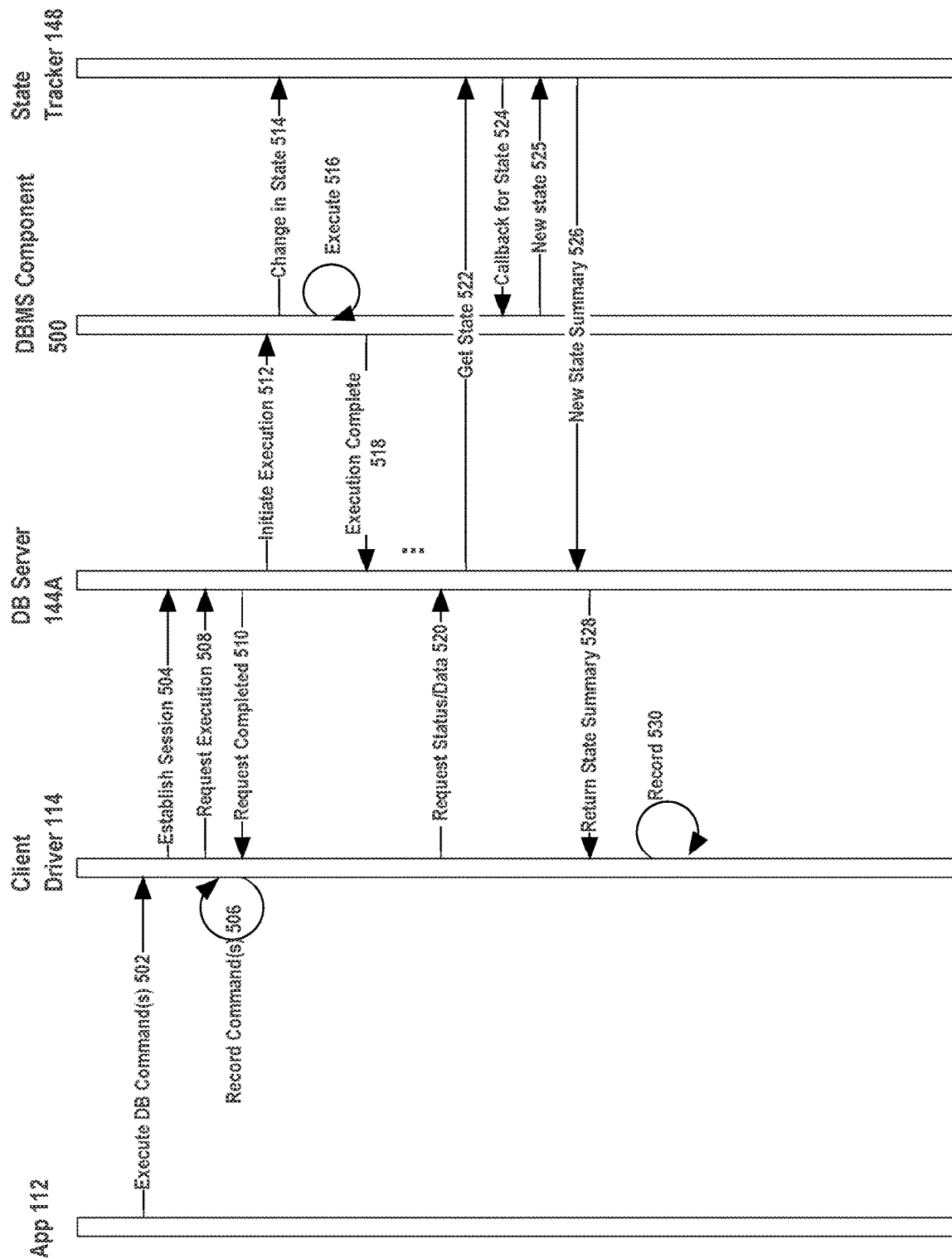
FIG. 5 is a sequence diagram that depicts the process for generating a session state summary, in an embodiment.

In an embodiment, session state tracker 148 verifies before returning the status on a set of commands, which of the state aspects that have been changed indeed have stayed changed. FIG. 5 is a sequence diagram that depicts a process for generating a session state summary, in an embodiment. DBI Application 112 sends a request to execute one or more commands at step 502. Client driver 114 establishes a session with DBMS 140 and, in particular, with database (DB) server 144A of DBMS 140 at step 504. Client driver 114 may record the requested database commands at step 506 by storing the commands in the replay context. Alternatively, client driver 114 may perform those steps after receiving the request status at step 510 or after receiving execution status/return data at step 510.

In response to receiving the request for execution of the set of commands at step 510, DB server 144A initiates the execution at step 512 by invoking a component of DBMS 140, DBMS component 500, in an embodiment. At step 514, DBMS component 500 invokes state tracker 148 to notify the state tracker of potential change in the state of an aspect of session managed by DBMS component 500. At step 516, DBMS component 500 continues the execution and updates the aspect of the session state accordingly. For the set of commands received by DB server 144A at step 508, DBMS component 500 may be invoked multiple times, and each time DBMS component 500 may update the aspect of session state according to the performance of the execution.

For example, one of the commands in the set of commands may include a statement for creating a temporary table. Execution of such a statement by DB server 144A invokes the temporary object manager component of DB server 144A to create a temporary table. The temporary object manager component invokes state tracker 148 to notify that for the current session, the state has been changed for the aspect describing the existence of a temporary table in the session.

In an embodiment, state tracker 148 instantiates and maintains a list of known session aspects and the changes that have been applied to those aspects. The state tracker 148 may maintain the aspects as individual session attribute-value pairs/objects and/or as session templates, each template being a collection of session attribute-value pairs. For illustrative purposes, the aspects of the session state may be described as session attribute-value pairs. However, the same techniques are applicable for the aspect(s) represented by a session template. Table 5 depicts an example list of attributes that may be tracked as standalone or as part of the corresponding session template. The metadata of the tracked attributes indicates their corresponding session aspect's state.

TABLE 5

Example list of tracked attributes

| Name | Classification | Changed? | Has State? | New Value |
|---|---|---|---|---|
| NLS_LANGUAGE | Client restorable | | | |
| NLS_CALENDAR | Client restorable | | | |
| NLS_DATE_FORMAT | Client restorable | | | |
| SECURE_ROLES | Server restorable | | | |
| APPLICATION_CONTEXT | Server restorable | | | |
| PLSQL Global Variable | Non-restorable | | | |
| Temporary Session Duration Lob | Non-restorable | | | |
| TEMPORARY Session Duration TABLE | Non-restorable | | | |

The metadata of a session attribute or a collection of session attributes in a session template includes the classification of the corresponding attribute or the collection of attributes. As discussed above, the classification of an attribute indicates whether the value of the session attribute can be restored. Additionally or alternatively, the classification may indicate which component of a system is responsible for restoring the attribute. For example, the type may indicate server restorable for attributes which values are restored by a database server of a DBMS. Client restorable attributes indicate that the client system, whose application has created the captured session on the DBMS, has knowledge about the session attribute and is able to restore the value of the attribute if necessary. In some embodiments, the restore is performed by the DBMS using the stored templates that include one or more client-restorable attributes.

State tracker 148 may maintain and update information on changes to session attributes as part of the metadata. In an embodiment, the change information is represented by the existence of a modified state for the session attribute. In another embodiment, the change information for a session attribute is represented by a) whether the execution of command(s) in a session has affected an aspect of the session state and b) if so, whether the modified state of the corresponding aspect has persisted when the status of the execution is returned to the client system. In such an embodiment, no capture is triggered unless the change to the aspect of the session exists at the end of the client call. Computational resources are saved by avoiding any processing of session attributes, which changed the state fails to persist through a client system call. Other embodiments may use delimiters other than the end of the client call to check for the persistence of the change to an aspect of session state—e.g., an end of the transaction for which the session state-altering commands were executed.

Continuing with FIG. 5, at 518, the execution of commands is complete by 518, and the corresponding aspect of the session state may have been changed. Many components of DBMS 140 may be invoked during the execution of the client requested command(s). Continuing with the above example of the temporary object management component executing the creation of a temporary object, such creation affects the "Session Duration Temporary Tables" session aspect. The temporary object management component updates the metadata to indicate that the "Session Duration Temporary Tables" session aspect has changed.

As a further example, one of the received commands may instantiate a large object (LOB). This causes the appropriate component to update state tracker 148 that the DBMS_LOB has changed. Another command in the received commands may de-allocate the instantiated LOB after the LOB has been used in processing. This command may also cause the appropriate component to update the "Session Duration Temporary LOB" session metadata to reflect that there has been a change (regardless that the current change undoes the previous change in the state).

Other components may also modify other aspects' state information. For example, the "ALTER SESSION" statement for the "LANGUAGE" attribute may be received from Client Driver 114. The session manager on DBMS 140 may process the statement in addition to updating the value for the "LANGUAGE" session attribute also update the metadata to indicate a modified state.

Session State Tracking: Obtaining Session State

Continuing with FIG. 5, at step 520, DB server 144A may receive a request from client driver 114 for the status/response for the commands requested for execution at step 508. Table 4 below depicts example updates to the metadata of the above-described session aspects when DBMS 140 receives status/response request for the above-mentioned sample commands:

TABLE 4

Example list of tracked attributes

| Name | Classification | Changed? | Has State? | New Value |
|---|---|---|---|---|
| LANGUAGE | Client restorable | Yes | | |
| NLS_CALENDAR | Client restorable | No | | |
| NLS_DATE_FORMAT | Client restorable | No | | |
| SECURE_ROLES | Server restorable | No | | |
| APPLICATION_CONTEXT | Server restorable | No | | |

TABLE 4-continued

Example list of tracked attributes

| Name | Classification | Changed? | Has State? | New Value |
|---|---|---|---|---|
| PLSQL Global Variable | Non-restorable | No | | |
| Session Duration Persistent Lob | Non-restorable | Yes | | |
| Session Duration Temporary table | Non-restorable | Yes | | |

Session State Tracking: Determining New Session State

At step 522, DB server 144A requests the states of changed aspects of the session from state tracker 148. State tracker 148 iterates through every changed aspect and requests the corresponding component to provide whether a modified state has been created by the change. Although step 524 in FIG. 5 depicts only a single component, DBMS component 500, in other embodiments, state tracker 148 queries many, and in some embodiments, all DBMS components that may affect an aspect of session state. State tracker 148 may do so using a call back registered by each component for the aspect of the session. In an embodiment, state tracker 148 determines which DBMS component to query based on the indication of the changed session aspect(s) in the session metadata. For example, the session metadata indicates that DBMS component 500's execution at step 516 has changed a particular aspect of the session state. At step 524, state tracker 148 queries DBMS component 500 to determine whether the change has generated a modified state of the session aspect and may receive information about the modified states at step 525.

In an embodiment, if the change has caused a modified state to be generated for the aspect of the session, a data representation of the modified state is generated and returned to state tracker 148 at step 525. The term "attribute state signature" refers to such a data representation. The attribute signature may be the new value of the corresponding session attribute itself or a unique representation thereof. An example of a unique representation is a hash-based representation of the new value.

In an embodiment in which the change affects an attribute, which is part of a session template, a new session template is generated using the techniques described herein, and the identifier of the new session template is used for an attribute state signature. In some embodiments, the values/templates/objects of a non-restorable attribute may not be returned, even if there has been a state change of the non-restorable attribute caused by the change. Attributes such as "Session Duration Temporary Table" or "Session Duration Persistent Lob" may reference very large objects for which generating a signature would not be practical. For this reason, the appropriate component may only return an indication that a modified state has been generated by the change.

In an embodiment, after state data for a changed session aspect is retrieved, the indicator of change to the session aspect is reset to denote that the state for the change has already been processed.

Continuing with the example based on above Table 4, state tracker 148 determines from the session state metadata depicted in Table 4 that there has been a change that may have affected the "LANGAUGE" aspect of the session state. State tracker 148 requests the session manager to determine whether the "LANGUAGE" aspect has a modified state. In response, the session manager confirms and provides the new session attribute value or a data representation thereof. Similarly, based on the session state metadata depicted in Table 4, state tracker 148 requests state information for the "Session Duration Persistent Lobs" aspect. Since the LOB that has caused the indication change has been since de-allocated, state tracker 148 receives a response that indicates that no change in state for "Session Duration Persistent Lobs" has occurred. On the other hand, the change for "Session Duration Temporary Tables" is determined to have caused a modified state. However, a new value for the state is not returned since "Session Duration Temporary Tables" is a non-restorable attribute. Accordingly, after callbacks for every changed session aspect are performed, Table 5 depicts an example of metadata for session state attributes.

TABLE 5

Example list of tracked attributes

| Name | Classification | Changed? | Has State? | New Value |
|---|---|---|---|---|
| NLS_LANGUAGE | Client restorable | No | Yes | 5 |
| NLS_CALENDAR | Client restorable | No | No | |
| NLS_DATE_FORMAT | Client restorable | No | No | |
| SECURE_ROLES | Server restorable | No | No | |
| APPLICATION_CONTEXT | Server restorable | No | No | |
| PLSQL GLOBAL variable | Non-restorable | No | No | |
| Session Duration Temporary Lobs | Non-restorable | No | No | |
| Session Duration Temporary Tables | Non-restorable | No | Yes | N/A |

In an embodiment, DBMS component 500 executes a statement with a side effect at step 516. In response to the callback for the session state at step 524, DBMS component 500 returns an indication about the existence of a side effect. In an embodiment in which no configuration exists for ignoring side-effects, as discussed above, the indication of a side-effect is recorded as part of the session state summary.

Session State Tracking: Generating Session State Summary

Continuing with FIG. 5, at step 526, state tracker 148 generates a session state summary based on the received states for various session aspects and sends the session state summary to client system 110 at step 528. In an embodiment, a session state summary includes information on states from changed session state aspect(s) and, in some embodiments, further includes information on unchanged aspects of session state. A combined session state signature may be created by generating an array or mathematically combining session attribute-value pairs and/or attribute state signatures. In an embodiment, the state signature is generated based on the states of changed aspects of the session and, thus, is a unique data representation of the changed session aspect(s). Accordingly, using techniques described below, the state signature may be used to verify whether the session is back to its initial state or whether the reset has set the session back to its original state.

In one embodiment, session attribute signatures are combined based on classifications of included session aspects. For example, the restorable attributes/templates may have separate state signature from the non-restorable ones, or client restorable from server restorable from non-restorable ones. In such an embodiment, the combined session state is represented by multiple state signatures, and each of those signatures may be compared for the verification of whether the session is at the initial state or has been reset to the initial state, preventing the leakage.

In such an embodiment, a session state summary for classification of session aspects includes an indication whether any of the session attributes of the classification has a modified state. If any of the session attributes or session templates for the classification has been determined to have modified states, then the session state summary of the classification reflects an indication of the existence of the modified state for the classification. Otherwise, if no session attribute/template has been determined to have a modified state, then the session state summary for the classification reflects that no state has changed. For example, based on Table 5's example modified states of attributes, since the client-restorable "LANGUAGE" attribute has been determined to have a modified state, then the session state summary for the client restorable attributes includes an indication of modified state. Similarly, the non-restorable attributes have a modified state for the "Session Duration Temporary Tables" session attribute. Thus, the session state summary reflects the same for the non-restorable attributes. On the other hand, none of the server restorable attributes are affected, and thus, the server restorable attributes have no modified state. Accordingly, the session state summary for server restorable indicates no modified state.

Table 6 below depicts the content of example session state summaries for classifications based on example session attributes of Table 5.

TABLE 6

Session State Summaries for Classifications

| Classification | Has State? | Signature |
|---|---|---|
| Client restorable | Yes | 5 |
| Server restorable | No | |
| Non-restorable | Yes | |

Continuing with FIG. 5, the generated session state summary is returned to DB server 144A, in response to a request for the session state at step 522. DB server 144A returns the received session state summary to client driver 114 to be stored in the replay context at step 530. In some embodiments, with the session state summary, DB server 144A may return to client driver 114 session attribute-value pair(s) and/or session template(s), which are represented by the session state summary and are recorded with the session state summary in the replay context.

Database Interfacing (Client) Application and Logical Connections to Database Management System A client driver for a database interfacing (DBI) application maintains a connection pool, which includes connections to database instances. The connection may refer to either a physical mechanism, such as a physical port, or a logical configuration, or both. There may be a one-to-one mapping of logical connections (i.e., database sessions) to physical connections. On the other hand, there may be more than one logical connection associated with a single physical connection. In one example, the free connections in the connection pool include only those connections that are not allocated to DBI applications for processing requests. As work completes, connections are returned to the connection pool and are available for subsequent DBI applications to borrow from the pool.

A DBI application is any logic running on one or more computing devices that uses a database connection to retrieve information from the database. The retrieved information may be presented or displayed to a user of the application or send to a client application. For example, the DBI application may be accessed from a browser, where the DBI application receives input from the user and presents information to the user. The DBI application may be an application that is accessed through a web portal, over a network, by the user, an application that is installed on a machine of the user, or an application that is distributed among multiple machines.

In one example, a DBI application issues a request to a DBMS for data from a database. The request may or may not be sent in response to user input. The DBI application selects a free connection from amongst the freed connections in the pool to database instances. A database connection that has been selected and/or customized for use by a client or group of clients is referred to herein as a "database session." A database connection may be customized to meet particular needs as a database session for a particular client, or the connection may be generalized such that the connection can be used to support a variety of database sessions for a variety of clients. The DBI application sends the client request on the selected connection to a database instance, and the database instance accesses a database to handle the request. The database server processes the request by retrieving or modifying data in the database or by retrieving or modifying the data in a cache of data from the database. The database server establishes a state for the database session as the database server processes the request.

DBI applications may be categorized into different classes based on their session state management—stateless, pre-set state, and heavy-state applications. When a stateless application obtains a connection from the pool, the stateless application doesn't apply any initial state to the established session. It has no expectations of a preserved state when the connection is returned to the pool.

A pre-set state DBI application may apply an initial state to a newly formed session over an obtained connection. However, the state change to the session due to the execution of commands over the session can be reset without adverse effect to the DBI application.

The third type of DBI applications is heavy-state applications. A heavy-state application relies on the state of the session to correctly and successfully execute commands over the database session. If the session state is not correctly rebuilt, then an error or wrong response may be generated for the DBI application.

For example, many mid-tier servers are heavy-state applications that provide database instance connections to client applications that request information from a database. A mid-tier server is a server that provides access to one or more database servers, distributes work to one or more database servers, or manages connections to one or more database servers. In one example, an Oracle® Fusion® Application is specially configured to retrieve data from an Oracle® database and display the information to a user of the Fusion® Application.

Although DBI applications rely on the states of database sessions to different degrees, neither a client driver nor a database server may be able to determine as to which type of DBI application has established a database session with a database. Accordingly, if the client driver or the database server has a limited ability to recover the state of a database session for the applications, neither can presume that it is a stateless application and the state can be recovered, or it is a heavy-state application, and no state can be recovered. To address this shortcoming in the recovery, load-balancing, and planned maintenance technology of the database management system, techniques are described herein that can rebuild the state of a database session transparently, reducing any downtime and enabling the transition of database sessions from one database server to another.

Database Management Systems

A database management system (DBMS) that may be hosted by a distributed system manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

In an embodiment, a DBMS may be connected to or include a cluster of nodes that may store one or more tables. The DBMS may manage tables stored on the cluster of nodes similar to managing tables stored on persistent storage.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL," the invention is not limited to just this particular database query language. It may be used in conjunction with other database query languages and constructs.

A client may issue a series of requests, such as requests for execution of queries, to a database server by establishing a database session, referred to herein as "session." A session comprises a particular connection established for a client to a database server, such as a database instance, through which the client may issue a series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system, such as a distributed system, is made up of interconnected nodes that share access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance." A database server may comprise multiple database instances, some or all of which are running on separate computers, including separate server blades.

Software Overview

Figure 6:
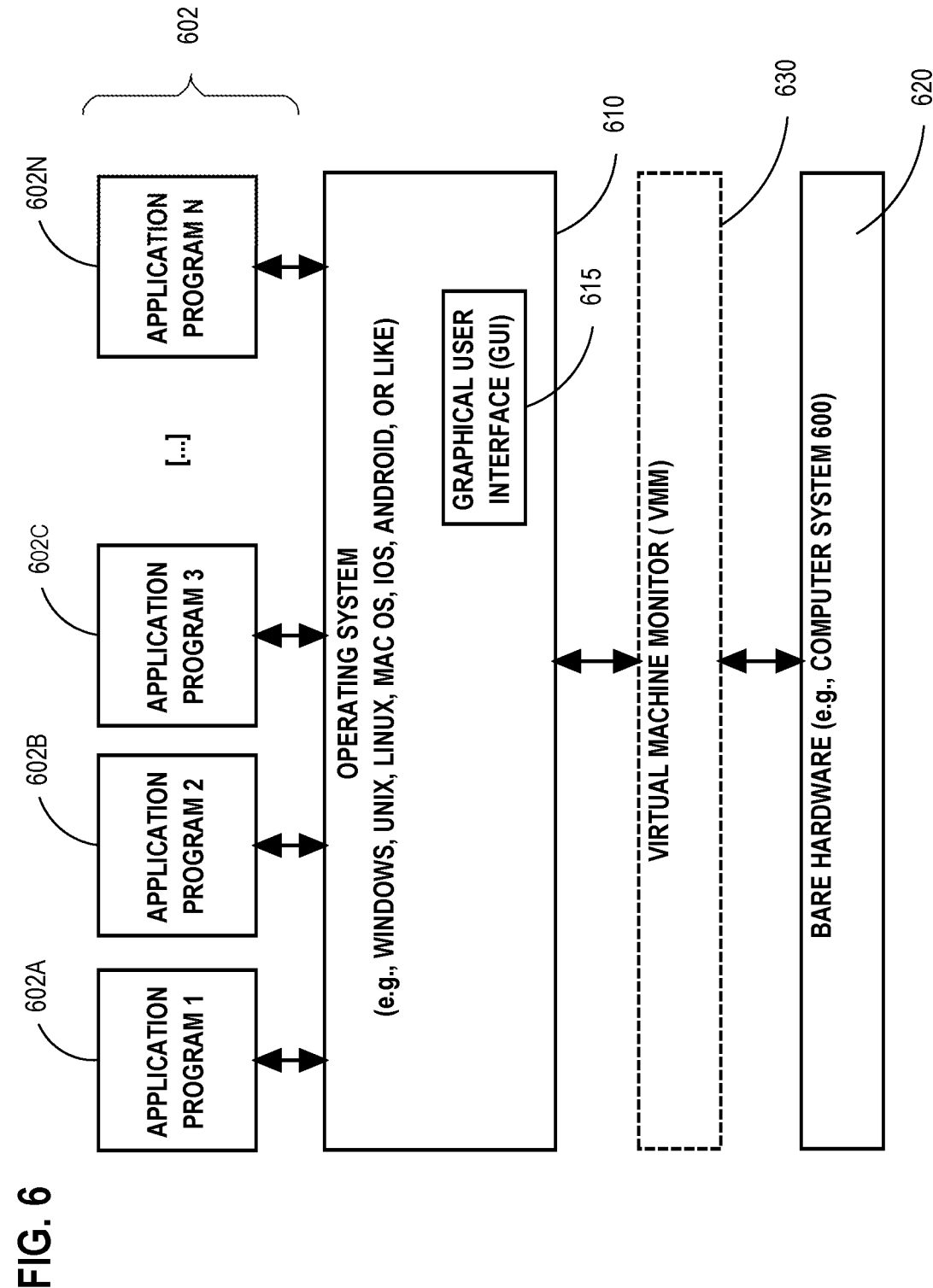
FIG. 6 is a block diagram of a basic software system, in one or more embodiments.
Figure 7:
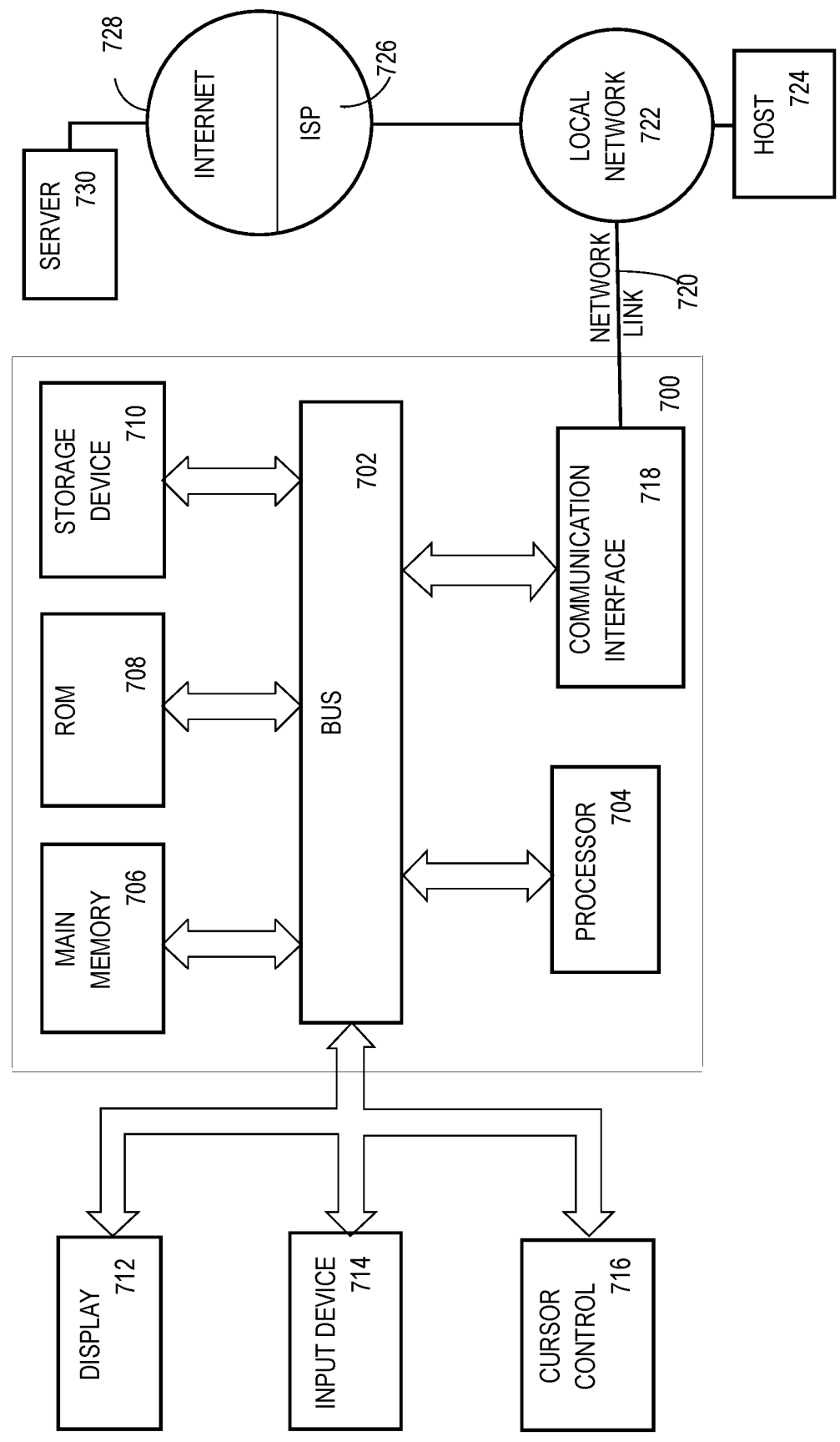
FIG. 7 is a block diagram that illustrates a computer system upon which an embodiment of the invention may be implemented.

FIG. 6 is a block diagram of a basic software system 600 that may be employed for controlling the operation of computing system 700 of FIG. 7. Software system 600 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 700. Software system 600, which may be stored in system memory (RAM) 706 and on fixed storage (e.g., hard disk or flash memory) 710, includes a kernel or operating system (OS) 610.

The OS 610 manages low-level aspects of computer operation, including managing the execution of processes, memory allocation, file input and output (I/O), and device I/O. One or more application programs represented as 602A, 602B, 602C . . . 602N, may be "loaded" (e.g., transferred from fixed storage 710 into memory 706) for execution by the system 600. The applications or other software intended for use on computer system 700 may also be stored as a set of downloadable computer-executable instructions, for example, for downloading and installation from an Internet location (e.g., a Web server, an app store, or another online service).

Software system 600 includes a graphical user interface (GUI) 615 for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 704) of computer system 700. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 700.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 700 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time and an allotment of memory (physical and/or virtual), the allotment of memory being for storing instructions executed by the hardware processor, for storing data generated by the hardware processor executing the instructions, and/or for storing the hardware processor state (e.g., the content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or the general public. In contrast, a private cloud environment is generally intended solely for use by or within a single organization. A community cloud is intended to be shared by several organizations within a community, while a hybrid cloud comprises two or more types of cloud (e.g., private, community, or public) that are bound together by data and application portability.

Generally, a cloud computing model enables some of those responsibilities which previously may have been provided by an organization's information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or another communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or another dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal, and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726, in turn, provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Computing Nodes and Clusters

A computing node is a combination of one or more hardware processors that each share access to a byte addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratch pad memory that cannot be accessed by any other core processor of the multiple core processors.

A cluster comprises computing nodes that each communicate with each other via a network. Each node in a cluster may be coupled to a network card or a network integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving a request from a client application to execute one or more commands within a session with a database management system (DBMS), the request having a begin request boundary and an end request boundary;
   identifying that the end request boundary for the request is reached within the same session or a next begin request boundary for a next request is detected within the same session;
   based on the identifying that the end request boundary is reached within the same session or the next begin request boundary is detected within the same session, verifying that the end request boundary or the next begin request boundary is at a resettable point of a session state of the session, wherein the verifying comprises:
      determining whether any transactional object is instantiated in the session,
      if it is determined that a transactional object is instantiated for a transaction, requesting a rollback of the transaction, and
      if it is determined that no transactional object is instantiated, determining that the end request boundary or the next begin request boundary is at a resettable point of the session state of the session;
   based at least in part on verifying that the end request boundary or the next begin request boundary is at a resettable point of the session state of the session:
   determining, based on session reset configuration data corresponding to the session, one or more session attributes from a plurality of session attributes of the session state of the session to reset, and
   based, at least in part, on the session reset configuration data, performing a reset of the session state of the session at least by resetting the one or more session attributes of the session state of the session.

2. The method of claim 1, wherein identifying the end request boundary for the request is reached within the same session or the next begin request boundary for the next request is detected within the session comprises receiving the end request boundary or the next begin request boundary from the client application.

3. The method of claim 1 further comprising:
   capturing the session state by receiving a session state summary caused at least in part by execution of the one or more commands on the DBMS, the session state summary comprising a restorable session state summary and a non-restorable session state summary;
sending the session state summary to a client driver causing the client driver to record the session state summary within a replay context of the client driver.

4. The method of claim 1, wherein identifying the end request boundary for the request is reached within the same session or the next begin request boundary for the next request is detected within the session comprises:
after execution of the one or more commands, the DBMS capturing the session state by generating a session state summary comprising a restorable session state summary and a non-restorable session state summary;
determining whether the non-restorable session state summary includes a modified state;
based at least in part on determining that the non-restorable session state summary does not include a modified state, determining that the end request boundary or the next begin request boundary is at a resettable point of the session state of the session.

5. The method of claim 1, wherein performing the reset of the session state comprises one or more of:
canceling any application-related open cursors associated with the session;
clearing application-related global variables associated with the session;
truncating application-related session duration temporary tables associated with the session;
truncating application-related session duration temporary lobs associated with the session; or
closing application-related database links associated with the session.

6. The method of claim 1, wherein performing the reset of the session state comprises:
retrieving one or more session attribute values for the one or more session attributes of the session state from session reset configuration data;
setting the session state to a reset state at least by setting the one or more session attributes of the session state to the one or more session attribute values.

7. The method of claim 1, wherein performing the reset of the session state comprises:
identifying an initial session state summary of the session generated at a session logon or at the begin request boundary of the request;
setting the session state to a state described by the initial session state summary.

8. The method of claim 1, further comprises, prior to performing the reset of the session state:
initiating capture of a new session state for the session state thereby generating a new session state summary comprising a new restorable session state summary and a new non-restorable session state summary;
determining whether the new restorable session state summary includes a modified state;
determining that the new non-restorable session state summary has no modified state.

9. One or more non-transitory computer-readable media storing instructions, wherein the instructions include a set of instructions, which when executed by one or more hardware processors, cause:
receiving a request from a client application to execute one or more commands within a session with a database management system (DBMS), the request having a begin request boundary and an end request boundary;
identifying that the end request boundary for the request is reached within the same session or a next begin request boundary for a next request is detected within the same session;
based on the identifying that the end request boundary is reached within the same session or the next begin request boundary is detected within the same session, verifying that the end request boundary or the next begin request boundary is at a resettable point of a session state of the session, wherein the verifying comprises:
determining whether any transactional object is instantiated in the session,
if it is determined that a transactional object is instantiated for a transaction,
requesting a rollback of the transaction, and
if it is determined that no transactional object is instantiated,
determining that the end request boundary or the next begin request boundary is at a resettable point of the session state of the session;
based at least in part on verifying that the end request boundary or the next begin request boundary is at a resettable point of the session state of the session:
determining, based on session reset configuration data corresponding to the session, one or more session attributes from a plurality of session attributes of the session state of the session to reset, and
based, at least in part, on the session reset configuration data, performing a reset of the session state of the session at least by resetting the one or more session attributes of the session state of the session.

10. The one or more non-transitory computer-readable media of claim 9, wherein the set of instructions further include instructions, which, when executed by said one or more hardware processors, cause receiving the end request boundary or the next begin request boundary from the client application.

11. The one or more non-transitory computer-readable media of claim 9, wherein the set of instructions further include instructions, which, when executed by said one or more hardware processors, cause:
capturing the session state by receiving a session state summary caused at least in part by execution of the one or more commands on the DBMS, the session state summary comprising a restorable session state summary and a non-restorable session state summary;
sending the session state summary to a client driver causing the client driver to record the session state summary within a replay context of the client driver.

12. The one or more non-transitory computer-readable media of claim 9, wherein the set of instructions further include instructions, which, when executed by said one or more hardware processors, cause:
after execution of the one or more commands, the DBMS capturing the session state by generating a session state summary comprising a restorable session state summary and a non-restorable session state summary;
determining whether the non-restorable session state summary includes a modified state; based at least in part on determining that the non-restorable session state summary does not include a modified state, determining that the end request boundary or the next begin request boundary is at a resettable point of the session state of the session.

13. The one or more non-transitory computer-readable media of claim 9, wherein the set of instructions further include instructions, which, when executed by said one or more hardware processors, cause:

canceling any application-related open cursors associated with the session;

clearing application-related global variables associated with the session;

truncating application-related session duration temporary tables associated with the session;

truncating application-related session duration temporary lobs associated with the session; or closing application-related database links associated with the session.

14. The one or more non-transitory computer-readable media of claim 9, wherein the set of instructions further include instructions, which, when executed by said one or more hardware processors, cause:

retrieving one or more session attribute values for the one or more session attributes of the session state from session reset configuration data;

setting the session state to a reset state at least by setting the one or more session attributes of the session state to the one or more session attribute values.

15. The one or more non-transitory computer-readable media of claim 9, wherein the set of instructions further include instructions, which, when executed by said one or more hardware processors, cause:

identifying an initial session state summary of the session generated at a session logon or at the begin request boundary of the request;

setting the session state to a state described by the initial session state summary.

16. The one or more non-transitory computer-readable media of claim 9, wherein the set of instructions further include instructions, which, when executed by said one or more hardware processors, cause:

prior to performing the reset of the session state:

initiating capture of a new session state for the session state thereby generating a new session state summary comprising a new restorable session state summary and a new non-restorable session state summary;

determining whether the new restorable session state summary includes a modified state;

determining that the new non-restorable session state summary has no modified state.

\* \* \* \* \*